(12) United States Patent
Lu et al.

(10) Patent No.: US 9,981,357 B2
(45) Date of Patent: May 29, 2018

(54) SYSTEMS AND METHODS FOR ENABLING AUTOMATED MOTION CONTROL OF A TOOL IN A MULTI-AXIS MACHINE TOOL

(71) Applicant: ELECTRO SCIENTIFIC INDUSTRIES, INC., Portland, OR (US)

(72) Inventors: Guang Lu, Lake Oswego, OR (US); Mehmet E. Alpay, Portland, OR (US); Mike Tyler, Hillsboro, OR (US); Qian Xu, Portland, OR (US); Jan Kleinert, Wilsonville, OR (US); Zhibin Lin, Portland, OR (US); James D. Brookhyser, Portland, OR (US); Ho Wai Lo, Portland, OR (US); Kurt M. Eaton, West Linn, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 0 days. days.

(21) Appl. No.: 15/188,496

(22) Filed: Jun. 21, 2016

(65) Prior Publication Data

US 2016/0368110 A1    Dec. 22, 2016

Related U.S. Application Data

(60) Provisional application No. 62/183,009, filed on Jun. 22, 2015, provisional application No. 62/281,967, filed on Jan. 22, 2016.

(51) Int. Cl.
G06F 19/00 (2011.01)
G05B 19/18 (2006.01)
(Continued)

(52) U.S. Cl.
CPC .......... B23Q 15/14 (2013.01); G05B 19/402 (2013.01); *G05B 2219/34015* (2013.01); *G05B 2219/50218* (2013.01)

(58) Field of Classification Search
CPC ....................................................... B23Q 1/34
(Continued)

(56) References Cited

U.S. PATENT DOCUMENTS 3,931,458 A   1/1976 Dini
5,109,148 A   4/1992 Fujita et al.
(Continued)

FOREIGN PATENT DOCUMENTS

CN    102402199 A    4/2012
CN    102999007 A    3/2013
(Continued)

OTHER PUBLICATIONS

International Search Report dated Oct. 6, 2016 concerning PCT Application No. PCT/US2016/038535, which corresponds with the subject U.S. Appl. No. 15/188,496. 2 pages.
(Continued)

*Primary Examiner* — Suresh Suryawanshi

(57) ABSTRACT

One embodiment of the present invention can be characterized as a method for controlling a multi-axis machine tool that includes obtaining a preliminary rotary actuator command (wherein the rotary actuator command has frequency content exceeding a bandwidth of a rotary actuator), generating a processed rotary actuator command based, at least in part, on the preliminary rotary actuator command, the processed rotary actuator command having frequency content within a bandwidth of the rotary actuator and generating a first linear actuator command and a second linear actuator command based, at least in part, on the processed rotary actuator command. The processed rotary actuator command
(Continued)

can be output to the rotary actuator, the first linear actuator command can be output to a first linear actuator and the second linear actuator command can be output to a second linear actuator.

19 Claims, 4 Drawing Sheets

(51) Int. Cl.
*B23Q 15/14* (2006.01)
*G05B 19/402* (2006.01)

(58) Field of Classification Search
USPC .......................................................... 700/170
See application file for complete search history.

(56) References Cited

U.S. PATENT DOCUMENTS

| | | | |
|---|---|---|---|
| 5,129,044 A | 7/1992 | Kashiwagi et al. | |
| 5,129,045 A | 7/1992 | Stelzer et al. | |
| 5,223,692 A | 6/1993 | Lozier et al. | |
| 5,231,264 A | 7/1993 | Fujita | |
| 5,239,160 A | 8/1993 | Sakura et al. | |
| 5,340,962 A | 8/1994 | Schmidt et al. | |
| 5,471,395 A | 11/1995 | Brien | |
| 5,484,982 A | 1/1996 | Nihei et al. | |
| 5,574,348 A | 11/1996 | Ehlerding | |
| 5,638,267 A | 6/1997 | Singhose et al. | |
| 5,734,412 A | 3/1998 | Hasebe et al. | |
| 5,751,585 A | 5/1998 | Culter et al. | |
| 5,910,260 A | 6/1999 | Gerber | |
| 5,988,411 A | 11/1999 | Singer et al. | |
| 6,065,338 A | 5/2000 | Stoiber et al. | |
| 6,249,102 B1 * | 6/2001 | Brakelmann | G05B 19/4141 |
| | | | 318/567 |
| 6,362,451 B1 | 3/2002 | Kami et al. | |
| 6,362,454 B1 | 3/2002 | Liu | |
| 6,393,687 B1 | 5/2002 | Friedrich | |
| 6,469,729 B1 | 10/2002 | Ryan | |
| 6,522,941 B1 | 2/2003 | Tashiro et al. | |
| 6,534,740 B1 | 3/2003 | Meiners et al. | |
| 6,617,544 B1 | 9/2003 | Tsukamoto et al. | |
| 6,678,094 B2 | 1/2004 | Sator et al. | |
| 6,706,999 B1 | 3/2004 | Barrett et al. | |
| 6,825,439 B2 | 11/2004 | Leibinger et al. | |
| 6,897,405 B2 | 5/2005 | Cheng et al. | |
| 6,930,275 B2 | 8/2005 | Yamazaki et al. | |
| 6,982,536 B2 | 1/2006 | Geissdöfer et al. | |
| 7,130,718 B2 | 10/2006 | Gunnarsson et al. | |
| 7,292,910 B2 | 11/2007 | Gmeiner | |
| 7,319,910 B2 | 1/2008 | Papiernik | |
| 7,355,614 B2 | 4/2008 | Franklin | |
| 7,450,127 B2 | 11/2008 | Hong et al. | |
| 7,482,776 B2 | 1/2009 | Scholich-Tessmann | |
| 7,710,060 B2 | 5/2010 | Cardinale et al. | |
| 7,767,932 B2 | 8/2010 | Zeygerman et al. | |
| 7,869,898 B2 | 1/2011 | Scholich-Tessmann | |
| 7,886,629 B2 | 2/2011 | Sartorio | |
| 7,933,677 B2 | 4/2011 | Lankalapalli et al. | |
| 7,969,111 B2 | 6/2011 | Otsuki et al. | |
| 8,000,838 B2 | 8/2011 | Bhatt et al. | |
| 8,024,068 B2 | 9/2011 | Gray | |
| 8,084,713 B2 | 12/2011 | Idaka et al. | |
| 8,121,717 B2 | 2/2012 | Idaka et al. | |
| 8,244,386 B2 * | 8/2012 | Gray | G05B 19/4061 |
| | | | 700/181 |
| 8,260,443 B2 | 9/2012 | Ehlerding | |
| 8,260,453 B2 | 9/2012 | Otsuki et al. | |
| 8,288,679 B2 | 10/2012 | Unrath | |
| 8,350,514 B2 * | 1/2013 | Otsuki | G05B 19/404 |
| | | | 318/568.15 |
| 8,374,706 B2 | 2/2013 | Bock et al. | |
| 8,392,002 B2 | 3/2013 | Pak et al. | |
| 8,404,998 B2 | 3/2013 | Unrath et al. | |
| 8,463,410 B2 | 6/2013 | Bock et al. | |
| 8,532,825 B1 * | 9/2013 | Freeman | B25J 9/1607 |
| | | | 700/263 |
| 8,725,283 B2 | 5/2014 | Gray et al. | |
| 8,921,734 B2 | 12/2014 | Yerazunis et al. | |
| 8,969,758 B2 | 3/2015 | Brunner et al. | |
| 9,261,872 B2 | 2/2016 | Shipiekandula et al. | |
| 9,274,517 B2 * | 3/2016 | Otsuki | G05B 19/416 |
| 9,436,176 B2 * | 9/2016 | Nakamura | G05B 19/4061 |
| 2007/0278980 A1 | 12/2007 | Wilson | |
| 2010/0286813 A1 | 11/2010 | Yamada | |
| 2012/0095599 A1 | 4/2012 | Pak et al. | |
| 2013/0060373 A1 | 3/2013 | Otsuki | |
| 2013/0190898 A1 | 7/2013 | Shipiekandula et al. | |
| 2014/0005804 A1 | 1/2014 | Brand | |
| 2014/0114463 A1 | 4/2014 | Shipiekandula et al. | |
| 2014/0330424 A1 | 11/2014 | Garaas et al. | |
| 2015/0158121 A1 | 6/2015 | Di Cairano et al. | |
| 2015/0241865 A1 | 8/2015 | Haghighat et al. | |
| 2015/0258632 A1 | 9/2015 | Pluess et al. | |
| 2015/0378343 A1 * | 12/2015 | Koga | G05B 19/19 |
| | | | 700/186 |

FOREIGN PATENT DOCUMENTS

| | | |
|---|---|---|
| DE | 102111192 11 A1 | 5/2013 |
| EP | 2315644 B1 | 4/2010 |
| JP | 2005074568 A | 3/2005 |
| JP | 2011070483 A | 4/2011 |
| JP | 2012043243 A | 3/2012 |
| WO | WO2008/151810 A1 | 12/2008 |
| WO | 2011/154379 A1 | 12/2011 |
| WO | WO2014009150 A1 | 1/2014 |

OTHER PUBLICATIONS

Written Opinion dated Oct. 6, 2016 concerning PCT Application No. PCT/US2016/038535, which corresponds with the subject U.S. Appl. No. 15/188,496. 3 pages.
Delta Tau, "Spectral Decomposition", 15 pages.
Aerotech, Inc., "Laser Raster-Scanning Patterns on Cylindrical Workpieces Using CADFusion and PSO Bitmap Tools", Dedicated to the Science of Motion, 2015, 4 pages.
Earth Tekniks, " Laser Marker", 20 pages.
DMG Mori, "Lasertec Series", progress through innovation, 54 pages.
Miyachi, "Fiber Laser Motion Control LMC1", 2 pages.

* cited by examiner

SYSTEMS AND METHODS FOR ENABLING AUTOMATED MOTION CONTROL OF A TOOL IN A MULTI-AXIS MACHINE TOOL

CROSS-REFERENCE TO RELATED APPLICATIONS

This application claims the benefit of U.S. Provisional Application No. 62/183,009, filed Jun. 22, 2015, and U.S. Provisional Application No. 62/281,967, filed Jan. 22, 2016, each of which is incorporated by reference in its entirety.

TECHNICAL FIELD

Embodiments of the present invention relate generally to systems and methods for enabling automated motion control, in which the position or movement of a tool in a multi-axis machine tool is controlled using one or more actuators.

BACKGROUND

Motion control is an important aspect in robotic systems (e.g., involving articulated robot configurations, Cartesian robot configurations, cylindrical robot configurations, polar robot configurations, delta robot configurations, or the like or combinations thereof), numerical control (NC) machines, computerized NC (CNC) machines, and the like (generically and collectively referred to herein as "machine tools," which can be adapted to process a workpiece). These machine tools typically include one or more controllers, one or more actuators, one or more sensors (each provided as a discrete devices, or embedded in an actuator), a tool holder or tool head, and various data communication subsystems, operator interfaces, and the like. Depending on the type and number of actuators included, a machine tool may be provided as a "multi-axis" machine tool, having multiple, independently-controllable axes of motion.

The continuing market need for higher productivity in machining and other automation applications has led to the increasing use of machine tools with various types of actuators, sensors and associated controllers. In some cases, a multi-axis machine tool (also referred to herein as a "hybrid multi-axis machine tool") may be equipped with multiple actuators capable of imparting movement along the same direction, but at different bandwidths. Generally, one actuator (e.g., a first actuator) can be characterized as having a higher bandwidth than another actuator (e.g., a second actuator) if the first actuator can impart movement in response to a command signal having a given spectral or frequency content more accurately than the second actuator can impart movement in response to the same command signal. Often, however, the range of motion over which the first actuator can impart movement will be less than range of motion over which the second actuator can impart movement.

Deciding which components of motion should be allocated between relatively-high and relatively-low bandwidth actuators of a hybrid multi-axis machine tool is not an easy task. A common strategy involves operating one or more relatively-low bandwidth actuators to move a workpiece to be processed and/or to move one or more relatively-high bandwidth actuators to a desired location or "zone" where the workpiece is to be processed, and then hold the position of relatively-low bandwidth actuator(s) constant while operating the relatively-high bandwidth actuator(s) during processing of the workpiece. Thereafter, the relatively-low bandwidth actuator(s) are operated to move the workpiece and/or the relatively-high bandwidth actuator(s) to another "zone" where the workpiece is to be processed. This "zone-by-zone" approach (also referred to as a "step-and-repeat" approach) to motion control is undesirable because it significantly limits throughput and flexibility of the hybrid multi-axis machine tool. It can also be difficult to appropriately or beneficially define the various "zones" of the workpiece where the relatively-high bandwidth actuator(s) can be operated.

U.S. Pat. No. 8,392,002, which is incorporated herein by reference in its entirety, is understood to address the above-mentioned problems associated with implementing the "zone-by-zone" approach by processing a part description program to decompose a tool tip trajectory (on the basis of frequency) defined in the part description program into different sets of position control data appropriate for the relatively-low and relatively-high bandwidth actuators of a hybrid multi-axis machine tool. However, and as acknowledged in U.S. Pat. No. 8,392,002, when the hybrid multi-axis machine tool is configured to hold a workpiece using 5-axis CNC manipulator with two rotary axes riding on a 3-axis Cartesian stage, and includes relatively-high bandwidth actuators to move a tool tip in the 3 Cartesian axes, use of the frequency-based decomposition approach can result in errors in the angles associated with the rotary axes.

SUMMARY

Figure 1:
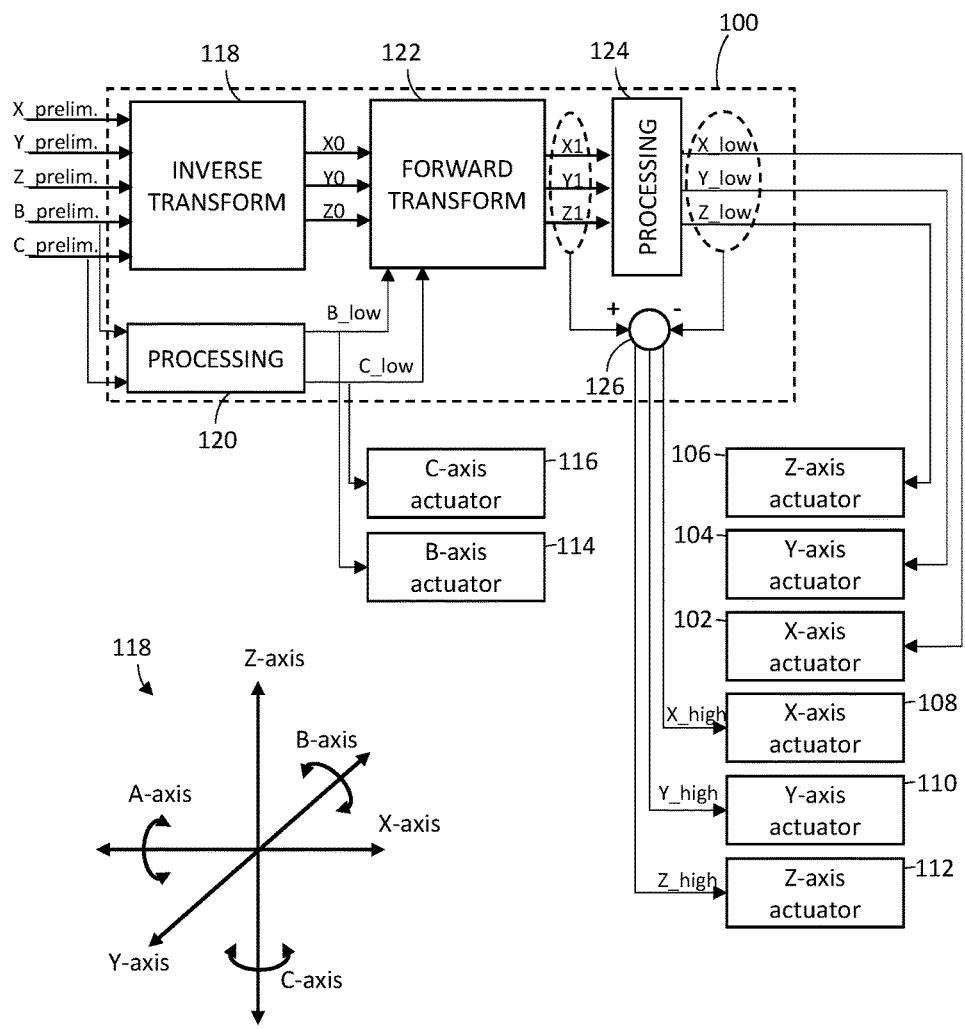
FIG. 1 is a block diagram schematically illustrating a control system for controlling a multi-axis machine tool according to one embodiment.

One embodiment of the present invention can be characterized as a method for controlling a multi-axis machine tool that is configured to process a workpiece using a tool. The multi-axis machine tool can include a rotary actuator configured to impart relative movement between the tool and the workpiece about a first axis, a first linear actuator configured to impart relative movement between the tool and the workpiece along the first axis and a second linear actuator configured to impart relative movement between the tool and the workpiece along a second axis. The method can include obtaining a preliminary rotary actuator command (wherein the rotary actuator command has frequency content exceeding a bandwidth of the rotary actuator), generating a processed rotary actuator command based, at least in part, on the preliminary rotary actuator command, the processed rotary actuator command having frequency content within a bandwidth of the rotary actuator and generating a first linear actuator command and a second linear actuator command based, at least in part, on the processed rotary actuator command. The processed rotary actuator command can be output to the rotary actuator, the first linear actuator command can be output to the first linear actuator and the second linear actuator command can be output to the second linear actuator.

Another embodiment of the present invention can be characterized as a controller for controlling a multi-axis machine tool (e.g., provided as exemplarily described above). The controller can include at least one processor and computer memory accessible to the at least one processor. The computer memory can have instructions stored thereon which, when executed by the at least one processor, cause the controller to: generate a processed rotary actuator command based, at least in part, on a preliminary rotary actuator command having frequency content exceeding a bandwidth of the rotary actuator (wherein the processed rotary actuator command has frequency content within a bandwidth of the rotary actuator); generate a first linear actuator command and a second linear actuator command based, at least in part, on the processed rotary actuator command; and output the processed rotary actuator command, the first linear actuator command and the second linear actuator command.

Another embodiment of the present invention can be characterized as a multi-axis machine tool that includes a tool configured to process a workpiece, a first rotary actuator configured to impart relative movement between the tool and the workpiece about a first axis, a first linear actuator configured to impart relative movement between the tool and the workpiece along the first axis, a second linear actuator configured to impart relative movement between the tool and the workpiece along a second axis and a controller operatively coupled to the rotary actuator, the first linear actuator and the second linear actuator. The controller can be configured to generate a processed rotary actuator command based, at least in part, on a preliminary rotary actuator command having frequency content exceeding a bandwidth of the rotary actuator (wherein the processed rotary actuator command has frequency content within a bandwidth of the rotary actuator), generate a first linear actuator command and a second linear actuator command based, at least in part, on the processed rotary actuator command, output the processed rotary actuator command to the rotary actuator, output the first linear actuator command to the first linear actuator and output the second linear actuator command to the second linear actuator.

DETAILED DESCRIPTION

Example embodiments are described herein with reference to the accompanying drawings. Unless otherwise expressly stated, in the drawings the sizes, positions, etc., of components, features, elements, etc., as well as any distances therebetween, are not necessarily to scale, but are exaggerated for clarity.

The terminology used herein is for the purpose of describing particular example embodiments only and is not intended to be limiting. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise specified, a range of values, when recited, includes both the upper and lower limits of the range, as well as any sub-ranges therebetween. Unless indicated otherwise, terms such as "first," "second," etc., are only used to distinguish one element from another. For example, one actuator could be termed a "first actuator" and similarly, another node could be termed a "second actuator", or vice versa. The section headings used herein are for organizational purposes only and are not to be construed as limiting the subject matter described.

Unless indicated otherwise, the term "about," "thereabout," etc., means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art.

Spatially relative terms, such as "below," "beneath," "lower," "above," and "upper," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

Like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

It will be appreciated that many different forms and embodiments are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

I. Overview

Embodiments described herein can be generally characterized as pertaining to a method for controlling a multi-axis machine tool that is configured to process a workpiece. Examples of multi-axis machine tools that may be controlled according to embodiments described herein include routers, milling machines, plasma cutting machines, electrical discharge machining (EDM) systems, laser cutting machines, laser marking machines, laser drilling machines, laser engraving machines, remote laser welding robots, 3D printers, waterjet cutters, abrasivejet cutters, and the like. Thus, the multi-axis machine tool can be characterized as being configured to physically contact the workpiece with a mechanical structure such as a router bit, a drill bit, a tool bit, a grinding bit, a blade, etc., to remove, cut, polish, roughen, etc., one or more materials from which the workpiece is formed. Additionally, or alternatively, the multi-axis machine tool can be characterized as being configured to direct energy (e.g., in the form of laser light generated by a laser source, heat generated by a torch, an ion beam or an electron beam generated from an ion or electron source, or the like or any combination thereof), direct a stream or jet of matter (e.g., water, air, sand or other abrasive particles, paint, metallic powder, or the like or any combination thereof), or the like or any combination thereof, to remove, cut, drill, polish, roughen, heat, melt, vaporize, ablate, crack, discolor, foam, or otherwise modify or alter one or more properties or characteristics (e.g., chemical composition, crystal structure, electronic structure, microstructure, nanostructure, density, viscosity, index of refraction, magnetic permeability, relative permittivity, etc.) of one or more materials from which the workpiece is formed. Such materials may be present at an exterior surface of the workpiece prior to or during workpiece processing, or may be located within the workpiece (i.e., not present at an exterior surface of the workpiece) prior to or during workpiece processing.

Regardless of how the workpiece is processed, any mechanism that is used to effect the processing of a workpiece (e.g., any of the aforementioned mechanical structures, any directed energy, directed streams or jets of matter, or the like, or any combination thereof) is herein referred to as a "tool." The portion or portions of the tool that physically contact the workpiece or that otherwise interact with the workpiece (e.g., via absorption of heat or electromagnetic radiation within the workpiece, by conversion of kinetic energy of incident electrons or ions into heat within the workpiece, by workpiece erosion, etc.) are herein individually and collectively referred to as the "tool tip," and any region of the workpiece that is ultimately processed by the tool (e.g., at the tool tip) is herein referred to as the "tooling region." In embodiments in which the tool is a mechanical structure that is rotatable about an axis that intersects the workpiece (e.g., as with a router bit, a drill bit, etc.), or in which the tool is energy or a stream or jet of matter directed onto the workpiece along an axis that intersects the workpiece, an angle of such an axis relative to the portion of the surface of the workpiece intersected by the axis is herein referred to as a "tooling angle."

The multi-axis machine tool includes one or more actuators to position the tool tip, to position the workpiece, to move the tool tip relative to the workpiece, to move the workpiece relative to the tool tip, or any combination thereof. Thus, the positioning of the tooling region on or within the workpiece can be changed upon imparting relative movement between the tool tip and the workpiece. Each actuator may be arranged or otherwise configured to position the tooling region or otherwise impart relative movement between the tooling region and the workpiece along at least one linear axis, along at least one rotary axis, or any combination thereof. As is known in the art, examples of linear axes include an X-axis, a Y-axis (orthogonal to the X-axis) and a Z-axis (orthogonal to the X- and Y-axes), and examples of rotary axes include an A-axis (i.e., defining rotation about an axis parallel to the X-axis), a B-axis (i.e., defining rotation about an axis parallel to the Y-axis) and a C-axis (i.e., defining rotation about an axis parallel to the Z-axis).

Actuators arranged or configured to position the tooling region or otherwise impart relative movement between the tooling region and the workpiece along a linear axis may be generally referred to as "linear actuators." Actuators arranged or configured to position the tooling region or otherwise impart relative movement between the tooling region and the workpiece along a rotary axis may be generally referred to as "rotary actuators." Examples of linear actuators that may be included within the multi-axis machine tool include one or more X-axis actuators (i.e., actuators arranged or configured to impart motion along the X-axis), one or more Y-axis actuators (i.e., actuators arranged or configured to impart motion along the Y-axis) and one or more Z-axis actuators (i.e., actuators arranged or configured to impart motion along the Z-axis), or any combination thereof. Examples of rotary actuators that may be included within the multi-axis machine tool include one or more A-axis actuators (i.e., actuators arranged or configured to impart motion along the A-axis), one or more B-axis actuators (i.e., actuators arranged or configured to impart motion along the B-axis) and one or more C-axis actuators (i.e., actuators arranged or configured to impart motion along the C-axis), or any combination thereof.

The multi-axis machine can be characterized as a "spectrally-complementary" multi-axis machine tool, or as a "non-spectrally-complementary" multi-axis machine tool. A spectrally-complementary multi-axis machine tool includes one or more sets of redundant actuators capable of imparting movement along the same axis, but at different bandwidths. A non-spectrally-complementary multi-axis machine tool does not include any sets of redundant actuators.

The multi-axis machine tool may be characterized as an "axially-complementary" multi-axis machine tool or as a "non-axially complementary" multi-axis machine tool. An axially-complementary multi-axis machine tool has a set of axially-complementary actuators including at least one rotary actuator configured to position the tool tip and/or the workpiece, or impart movement to the tool tip and/or the workpiece, along at least one rotary axis, and at least one linear actuator configured to position the tool tip and/or the workpiece, or impart movement to the tool tip and/or the workpiece, along at least one linear axis. In an axially-complementary multi-axis machine tool, at least one rotary axis about which the tool and/or workpiece is rotatable is not parallel to at least one linear axis along which the tool and/or workpiece can be translated. For example, a set of axially-complementary actuators may include a rotary actuator configured to impart motion along the B-axis, and at least one linear actuator configured to impart motion along the X-axis, along the Z-axis, or along the X- and Z-axes. In another example, a set of axially-complementary actuators may include a rotary actuator configured to impart motion along the B-axis, and at least one rotary actuator configured to impart motion along the C-axis, and at least one linear actuator configured to impart motion along the X-axis, along the Z-axis, or along the X- and Z-axes. Generally, however, a set of axially-complementary actuators can be characterized as being non-redundant with one another. A non-axially-complementary multi-axis machine tool does not include a set of axially-complementary actuators. It should be recognized that either a spectrally-complementary multi-axis machine tool or a non-spectrally-complementary multi-axis machine tool can be configured as an axially-complementary multi-axis machine tool or as a non-axially-complementary multi-axis machine tool.

Generally, actuators of the multi-axis machine tool are driven in response to actuator commands that are obtained, or otherwise derived from, a computer file or a computer program. In an embodiment in which an actuator command is derived from a computer file or a computer program, such actuator command may be interpolated from a trajectory (or a component of the trajectory) that is defined in a computer file or by a computer program. The trajectory can define a sequence of tool tip and/or workpiece positions and/or movements (e.g., along one or more spatial axes), that describe how the tooling region is to be positioned, oriented, moved, etc., during processing of the workpiece by the multi-axis machine tool.

Generally, different actuator commands can correspond to different axial positions or movements, whereby a "linear actuator command" is an actuator command corresponding to a linear component of position or movement and a "rotary actuator command" is an actuator command corresponding to a rotational component of position or movement. In particular, an "X-axis actuator command" can correspond to a linear component of position or movement along an X-axis, a "Y-axis actuator command" can correspond to a linear component of position or movement along a Y-axis (where the Y-axis is orthogonal to the X-axis), a "Z-axis actuator command" can correspond to a linear component of position or movement along a Z-axis (where the Z-axis is orthogonal to the Y-axis), an "A-axis actuator command" can correspond to a rotational component of position or movement along an "A-axis" (A-axis rotational motion characterizes rotation about an axis parallel to the X-axis), a "B-axis actuator command" can correspond to a rotational component of position or movement along a "B-axis" (B-axis rotational motion characterizes rotation about an axis parallel to the Y-axis), and a "C-axis actuator command" can correspond to a rotational component of position or movement along a "C-axis" (C-axis rotational motion characterizes rotation about an axis parallel to the Z-axis).

As used herein, the term "actuator command" refers to an electrical signal characterized by an amplitude that changes over time and can, thus, be characterized in terms of what is known in the art as "frequency content." Typically, an actuator of the multi-axis machine tool will be characterized by one or more constraints (e.g., a velocity constraint, an acceleration constraint, a jerk constraint, etc.) that limits the bandwidth of the actuator. As used herein, the "bandwidth" of an actuator refers to the ability of actuator to accurately or reliably react or respond to an actuator command (or a portion of the actuator command) having frequency content exceeding a threshold frequency associated with the actuator. It should be recognized that the threshold frequency for any particular actuator can vary depending upon the type of the particular actuator, the specific construction of the particular actuator, the mass of the particular actuator, the mass of any objects attached to or movable by the particular actuator, and the like. For example, threshold frequencies for types of actuators such as servo motors, stepper motors, hydraulic cylinders, etc. may be the same or different from one another (as is known in the art), but are generally less than threshold frequencies for types of actuators such as galvanometers, voice-coil motors, piezoelectric actuators, electron beam magnetic deflectors, magnetostrictive actuators, etc. (which, as is known in the art, may be the same as, or different from, each other). Depending on the manner in which they are configured, a rotary actuator can have a threshold frequency that is less than that of a linear actuator.

Ultimately, an actuator command is output to a corresponding actuator of the multi-axis machine tool, wherein each actuator is operative to position or move the tool tip and/or the workpiece along an axis that corresponds to the component of position or movement associated with the received actuator command. For example, an X-axis actuator command will ultimately be output to a linear actuator arranged or configured to position or move the tool tip and/or workpiece along the X-axis, a B-axis actuator command will ultimately be output to a rotary actuator arranged or configured to position or move the tool tip and/or workpiece along the B-axis (i.e., to rotate the tool tip and/or workpiece about the Y-axis), etc. If a trajectory describes a movement that can be decomposed into two or more components of movement (e.g., concurrent motion in two or more of the X-, Y-, Z-, A-, B- or C-axes), then such components of motion can be characterized as being "associated" with one another. Actuator commands that correspond to associated components of motion described by a trajectory can, likewise, be characterized as being "associated" with one another. When actuator commands are output to the actuators in a synchronized or otherwise coordinated manner, the actuators essentially react or respond by imparting relative movement between the tool tip and the workpiece in manner that moves the tooling region along a path that matches or otherwise corresponds to the desired trajectory.

Some general embodiments concerning the generation and use of certain sets of actuator commands (i.e., "spectrally-complementary actuator commands" and "axially-complementary actuator commands") discussed in the Sections below. While the two sets of actuator commands are generally described as being separately generated and used, it should be recognized that the two sets of actuator commands can be generated and used together in a combined manner. Some examples of combined generation and use of the two sets of actuator commands will be described in greater detail with respect to FIGS. 1 to 4.

A. Embodiments Concerning Actuator Commands for Spectrally-Complementary Multi-Axis Machine Tools, Generally In an embodiment in which the multi-axis machine tool is a hybrid multi-axis machine tool, a set of spectrally-complementary actuator commands may be output to a corresponding set of redundant actuators. Within a set of spectrally-complementary actuator commands, the frequency content of one of the actuator commands (e.g., a first actuator command) will be higher than the frequency content of another one of the actuator commands (e.g., a second actuator command), and the first actuator command will ultimately be output to a relatively-high bandwidth actuator in the set of redundant actuators (e.g., capable of accurately or reliably reacting or responding to the first spectrally-complementary actuator commands) while the second actuator command will ultimately be output to a relatively-low bandwidth actuator in the set of redundant actuators (e.g., capable of more accurately or reliably reacting or responding to the second frequency command than to the first frequency command).

The set of spectrally-complementary actuator commands can be generated in any suitable manner. For example, the set of spectrally-complementary actuator commands can be generated by processing an actuator command (e.g., describing a position or movement along a single axis, such as the X-, Y-, Z-, A-, B- or C-axis, or the like) obtained or otherwise derived from a computer file or a computer program as discussed above. In this case, such an actuator command is also referred to as a "preliminary actuator command," and has a frequency content spanning a preliminary range of frequencies. The preliminary range of frequencies may include non-negligible frequency content at one or more frequencies that exceeds the threshold frequency of at least one actuator in the set of redundant actuators. The preliminary actuator command may be processed to create a set of spectrally-complementary actuator commands.

Generally, each spectrally-complementary actuator command has a frequency content spanning a sub-range of frequencies that is less than and within the preliminary range. Specifically, the frequency content of each actuator command in the set of spectrally-complementary actuator commands includes non-negligible frequency content at one or more frequencies that does not exceed the threshold frequency of a corresponding actuator in the set of redundant actuators. For example, within a set of spectrally-complementary actuator commands, the frequency content of one of the spectrally-complementary actuator commands (e.g., a first spectrally-complementary actuator command to be ultimately output to a first actuator in the set of redundant actuators) will span a first sub-range of frequencies and the frequency content of another of the spectrally-complementary actuator commands (e.g., a second spectrally-complementary actuator command to be ultimately output to a second actuator in the set of redundant actuators) will span a second sub-range of frequencies. In one embodiment, an average frequency of the first sub-range may be less than, greater than or equal to an average frequency of the second sub-range. The extent of the first sub-range may be greater than, less than, or equal to the extent of the second sub-range. The first sub-range may overlap, adjoin, or be spaced apart from the second sub-range.

In some embodiments, processing of the preliminary actuator command can include applying one or more suitable filters to the preliminary actuator command (or another command derived from the preliminary actuator command), by modifying the preliminary actuator command (or another command derived from the preliminary actuator command) according to one or more suitable algorithms, by decimating the preliminary actuator command (or another command derived from the preliminary actuator command), applying one or more low-order interpolation to the preliminary actuator command (or another command derived from the preliminary actuator command), or the like or any combination thereof. Examples of suitable filters include digital filters, low pass filters, Butterworth filters, or the like or any combination thereof. Examples of suitable algorithms include an auto-regressive moving-average algorithm, or the like. In some embodiments, the set of spectrally-complementary actuator commands can be generated as described in one or more of U.S. Pat. Nos. 5,751,585, 6,706,999, and 8,392,002, each of which is incorporated herein by reference in its entirety. It should be recognized, however, that the set of spectrally-complementary actuator commands can be generated according to techniques described in one or more of U.S. Pat. Nos. 5,638,267, 5,988,411, 9,261,872 or in one or more of U.S. Patent App. Pub. Nos. 2014/0330424, 2015/0158121, 2015/0241865, each of which is incorporated herein by reference in its entirety.

Although the set of spectrally-complementary processed actuator commands has been described as including only two spectrally-complementary actuator commands, it should be recognized that the set of spectrally-complementary actuator commands can include any number of spectrally-complementary actuator commands (e.g., 3, 4, 5, 6, 7, 8, etc.). The number of spectrally-complementary actuator commands in a set of spectrally-complementary actuator commands corresponding to a common axis can be equal to the number of redundant actuators in the set of redundant actuators capable of positioning or imparting movement along the common axis.

B. Embodiments Concerning Actuator Commands for Axially-Complementary Multi-Axis Machine Tools, Generally Sometimes, a rotary actuator command (e.g., a B-axis actuator command) to be issued to a rotary actuator (e.g., a B-axis actuator) contains non-negligible frequency content that exceeds the threshold frequency of the rotary actuator. Accordingly, and in an embodiment in which the multi-axis machine tool is an axially-complementary multi-axis machine tool, a set of axially-complementary actuator commands may be output to a set of axially-complementary actuators, which includes the rotary actuator, to compensate for the limited bandwidth capability of the rotary actuator. For example, a set of axially-complementary actuator commands may include an axially-complementary rotary actuator command having a frequency content that does not exceed the threshold frequency of the rotary actuator, and at least one axially-complementary linear actuator command. The axially-complementary rotary actuator command may be output to the rotary actuator, and the at least one axially-complementary linear actuator command may be output one or more corresponding linear actuators (i.e., that are in the same set of axially-complementary actuators as the rotary actuator).

The set of axially-complementary actuator commands can be generated in any suitable manner. For example, the set of axially-complementary actuator commands can be generated by processing a rotary actuator command (e.g., describing a position or movement along a single rotary axis, such as the B-axis) obtained or otherwise derived from a computer file or a computer program as discussed above. In this case, such a rotary actuator command is also referred to as a "a rotary actuator command," and has a frequency content spanning a preliminary range of frequencies. The preliminary range of frequencies may include non-negligible frequency content at one or more frequencies that exceeds the threshold frequency of the rotary actuator. The preliminary rotary actuator command may be processed to create a set of axially-complementary actuator commands that includes at least one axially-complementary rotary actuator command and at least one axially-complementary linear actuator command.

In some embodiments, the processing of the preliminary rotary actuator command can include applying one or more suitable filters to the preliminary rotary actuator command (or another command derived from the preliminary rotary actuator command), by modifying the preliminary rotary actuator command (or another command derived from the preliminary rotary actuator command) according to one or more suitable algorithms, by decimating the preliminary rotary actuator command (or another command derived from the preliminary rotary actuator command), applying one or more low-order interpolation to the preliminary rotary actuator command (or another command derived from the preliminary rotary actuator command), or the like or any combination thereof. Examples of suitable filters include digital filters, low pass filters, Butterworth filters, or the like or any combination thereof. Examples of suitable algorithms include an auto-regressive moving-average algorithm, or the like.

II. Controlling a Multi-Axis Machine Tool Having Axially-Complementary Actuators and Redundant Linear Actuators FIG. 1 is a block diagram schematically illustrating a control system 100 for controlling a multi-axis machine tool which, according to one embodiment, includes a relatively-low bandwidth X-axis actuator 102, a relatively-low bandwidth Y-axis actuator 104, a relatively-low bandwidth Z-axis actuator 106, a relatively-high bandwidth X-axis actuator 108, a relatively-high bandwidth Y-axis actuator 110, a relatively-high bandwidth Z-axis actuator 112, a B-axis actuator 114 and a C-axis actuator 116. A legend illustrating the spatial relationships between the axes discussed herein is illustrated at 118.

The relatively-low and relatively-high bandwidth X-axis actuators 102 and 108, respectively, constitute a set of redundant actuators (i.e., a set of redundant X-axis actuators). Likewise, a set of redundant actuators is constituted by each pair of the relatively-low and relatively-high bandwidth Y-axis actuators 104 and 110, respectively (i.e., a set of redundant Y-axis actuators), and the relatively-low and relatively-high bandwidth Z-axis actuators 106 and 112, respectively (i.e., a set of redundant Z-axis actuators). Although the illustrated embodiment describes a multi-axis machine tool having a set of redundant linear actuators constituted by only two linear actuators, it will be appreciated that the multi-axis machine tool may be further equipped with one or more additional linear actuators arranged or configured to impart movement along any of the X-, Y- and Z-axes, so that any set of redundant actuators may include three or more linear actuators.

In one embodiment, no actuator within any set of redundant actuators is attached to, or moved by another actuator in the same set of redundant actuators. For example, the relatively-high bandwidth X-axis actuator 108 is not attached to, nor is it moved by, the relatively-low bandwidth X-axis actuator 102. In another embodiment, however, at least one actuator within a set of redundant actuators may be attached to, and moved by, another actuator in the same set of redundant actuators. In such an embodiment, a relatively-low bandwidth actuator in a set of redundant actuators may move, or may be moved by, a relatively-high bandwidth actuator in the set of redundant actuators.

In one embodiment, the B-axis actuator 114, considered with one or more actuators within the set of redundant X-axis actuators and/or one or more within the set of redundant Z-axis actuators, constitutes a set of axially-complementary actuators. In another embodiment, the C-axis actuator 116, considered with one or more actuators within the set of redundant X-axis actuators and/or one or more within the set of redundant Y-axis actuators, constitutes a set of axially-complementary actuators In yet another embodiment, the B-axis actuator 114 and the C-axis actuator 116, considered with one or more actuators within the set of redundant X-axis actuators, one or more actuators within the set of redundant Y-axis actuators and/or one or more within the set of redundant Z-axis actuators, constitutes a set of axially-complementary actuators.

In the illustrated embodiment, the multi-axis machine tool does not include any A-axis actuator. It should be recognized, however, that the multi-axis machine tool may include an A-axis actuator and that the embodiments discussed herein may be adapted to control the A-axis actuator as discussed herein.

A. Embodiments Concerning the Workpiece Positioning Assembly

Figure 2:
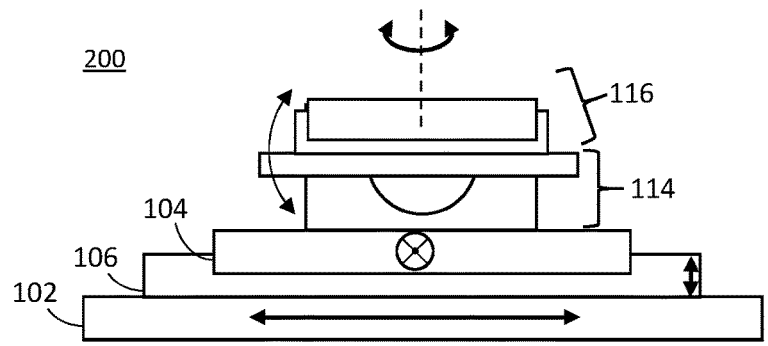
FIG. 2 schematically illustrates a workpiece positioning assembly according to one embodiment of the present invention.

In one embodiment, the relatively-low bandwidth X-axis actuator 102, relatively-low bandwidth Y-axis actuator 104, relatively-low bandwidth Z-axis actuator 106, B-axis actuator 114 and C-axis actuator 116 may be incorporated as part of a "workpiece positioning assembly" configured to position or otherwise move a workpiece along the X-axis, Y-axis, Z-axis, B-axis, C-axis, or any combination thereof, either simultaneously or non-simultaneously. For example, each of the relatively-low bandwidth X-axis actuator 102, relatively-low bandwidth Y-axis actuator 104, relatively-low bandwidth Z-axis actuator 106, B-axis actuator 114 and C-axis actuator 116 may include one or more components (e.g., stages, fixtures, chucks, rails, bearings, brackets, clamps, straps, bolts, screws, pins, retaining rings, ties, etc., not shown) to permit one or more of such actuators to be mounted to or otherwise mechanically coupled to one another. In this case, the relatively-low bandwidth Z-axis actuator 106 may be mounted on the relatively-low bandwidth X-axis actuator 102 (e.g., so as to be movable by the relatively-low bandwidth X-axis actuator 102), the relatively-low bandwidth Y-axis actuator 104 may be mounted on the relatively-low bandwidth Z-axis actuator 106 (e.g., so as to be movable by the relatively-low bandwidth Z-axis actuator 106, relatively-low bandwidth X-axis actuator 102, or any combination thereof), the B-axis actuator 114 may be mounted on the relatively-low bandwidth Y-axis actuator 104 (e.g., so as to be movable by the relatively-low bandwidth Y-axis actuator 104, relatively-low bandwidth Z-axis actuator 106, relatively-low bandwidth X-axis actuator 102, or any combination thereof) and the C-axis actuator 116 may be mounted on the B-axis actuator 114 (e.g., so as to be movable by the B-axis actuator 114, relatively-low bandwidth Y-axis actuator 104, relatively-low bandwidth Z-axis actuator 106, relatively-low bandwidth X-axis actuator 102, or any combination thereof). FIG. 2 schematically illustrates the exemplary arrangement of actuators in a workpiece positioning assembly (e.g., workpiece positioning assembly 200), as discussed above. In other embodiments, however, one or more of the actuators within the workpiece positioning assembly may be different arranged in any other suitable or desirable manner. It should also be recognized that one or more of the relatively-low bandwidth X-axis actuator 102, relatively-low bandwidth Y-axis actuator 104, relatively-low bandwidth Z-axis actuator 106, B-axis actuator 114 and C-axis actuator 116 may be omitted from the workpiece positioning assembly, as suitable or if otherwise desired.

In view of the above, it should be recognized that each of the relatively-low bandwidth X-axis actuator 102, relatively-low bandwidth Y-axis actuator 104, relatively-low bandwidth Z-axis actuator 106, B-axis actuator 114 and C-axis actuator 116 may be provided as one or more stages (e.g., direct-drive stages, lead-screw stages, ball-screw stages, belt-driven stages, etc.), each driven by one or more hydraulic cylinders, one or more pneumatic cylinders, one or more servo motors, one or more voice-coil actuators, one or more piezoelectric actuators, one or more electrostrictive elements, or the like or any combination thereof. Moreover, any of the relatively-low bandwidth X-axis actuator 102, relatively-low bandwidth Y-axis actuator 104, relatively-low bandwidth Z-axis actuator 106, B-axis actuator 114 and C-axis actuator 116 may be configured to provide continuous or stepped (incremental) motion.

A workpiece fixture (not shown) may be mechanically coupled to the workpiece positioning assembly (e.g., at the relatively-low bandwidth C-axis actuator 116) to hold, retain, carry, etc., the workpiece in any suitable or desired manner. Accordingly, the workpiece can be coupled to the workpiece positioning assembly by way of the fixture. The workpiece fixture may be provided as one or more chucks or other clamps, clips, or other fastening devices (e.g., bolts, screws, pins, retaining rings, straps, ties, etc.), to which the workpiece can be clamped, fixed, held, secured or be otherwise supported.

B. Embodiments Concerning the Tool Tip Positioning Assembly

In one embodiment, the relatively-high bandwidth X-axis actuator 108, relatively-high bandwidth Y-axis actuator 110 and the relatively-high bandwidth Z-axis actuator 112 may be incorporated within a "tool tip positioning assembly" configured to position or otherwise move a tool tip associated with the multi-axis machine tool along the X-axis, Y-axis, Z-axis, or any combination thereof, either simultaneously or non-simultaneously. It should be recognized, however, that one or more of the relatively-high bandwidth X-axis actuator 108, relatively-high bandwidth Y-axis actuator 110 and the relatively-high bandwidth Z-axis actuator 112 may be omitted from the tool tip positioning assembly, as suitable or if otherwise desired. Generally, and depending upon the mechanism that is used to effect the processing of a workpiece (i.e., the "tool" to be used), the tool tip positioning assembly can be characterized as a "serial tool tip positioning assembly," as a "parallel tool tip positioning assembly" or a "hybrid tool tip positioning assembly" (e.g., combining characteristics unique to the serial tool tip positioning assembly and the parallel tool tip positioning assembly).

i. Embodiments Concerning the Serial Tool Tip Positioning Assembly

In one embodiment, a serial tool tip positioning assembly can be employed when the tool to be used is a mechanical structure (e.g., a router bit, a drill bit, a tool bit, a grinding bit, a blade, etc.). Within a serial tool tip positioning assembly, each of the relatively-high bandwidth X-axis actuator 108, relatively-high bandwidth Y-axis actuator 110 and relatively-high bandwidth Z-axis actuator 112 may include one or more components (e.g., stages, fixtures, chucks, rails, bearings, brackets, clamps, straps, bolts, screws, pins, retaining rings, ties, etc., not shown) to permit one or more of such actuators to be mounted or otherwise mechanically coupled to one another. In this case, the relatively-high bandwidth Y-axis actuator 110 may be mounted on the relatively-high bandwidth X-axis actuator 108 (e.g., so as to be movable by the relatively-high bandwidth X-axis actuator 108) and the relatively-high bandwidth Z-axis actuator 112 may be mounted on the relatively-high bandwidth Y-axis actuator 110 (e.g., so as to be movable by the relatively-high bandwidth Y-axis actuator 110, relatively-high bandwidth X-axis actuator 108, or any combination thereof). In other embodiments, however, one or more of the actuators within the serial tool tip positioning assembly may be different arranged in any other suitable or desirable manner. The serial tool tip positioning assembly is typically employed when the tool to be used includes a mechanical structure (e.g., a router bit, a drill bit, a tool bit, a grinding bit, a blade, etc.). The serial tool tip positioning assembly can also be employed when the tool to be used includes a stream or jet of matter (e.g., water, air, sand or other abrasive particles, paint, metallic powder, or the like or any combination thereof) ejected from, for example, a nozzle, head, etc.

In view of the above, it should be recognized that each of the relatively-high bandwidth X-axis actuator 108, relatively-high bandwidth Y-axis actuator 110 and relatively-high bandwidth Z-axis actuator 112 in the serial tool tip positioning assembly may be provided as one or more linear stages (e.g., direct-drive stages, lead-screw stages, ball-screw stages, belt-driven stages, etc.), each driven by one or more hydraulic cylinders, one or more pneumatic cylinders, one or more servo motors, one or more voice-coil actuators, one or more piezoelectric actuators, one or more electrostrictive elements, or the like or any combination thereof. Moreover, any of the relatively-high bandwidth X-axis actuator 108, relatively-high bandwidth Y-axis actuator 110 and relatively-high bandwidth Z-axis actuator 112 in the serial tool tip positioning assembly may be configured to provide continuous or stepped (incremental) motion.

A tool fixture (not shown) may be mechanically coupled to the serial tool tip positioning assembly (e.g., at the relatively-high bandwidth Z-axis actuator 112) to hold, retain, carry, etc., a mechanical structure (e.g., a router bit, a drill bit, a tool bit, a grinding bit, a blade, etc.) in any suitable or desired manner. Accordingly, the mechanical structure can be coupled to the serial tool tip positioning assembly by way of a tool fixture, which may be provided as one or more chucks or other clamps, clips, or other fastening devices (e.g., bolts, screws, pins, retaining rings, straps, ties, etc.). If the tool to be used includes a stream or jet of matter (e.g., water, air, sand or other abrasive particles, paint, metallic powder, or the like or any combination thereof, provided by a source of water, air, sand, particles, paint, powder, or the like or any combination thereof, as is known in the art), then the nozzle, head, etc., from which the stream or jet is ejected can be characterized as the tool fixture.

ii. Embodiments Concerning the Parallel Tool Tip Positioning Assembly

In one embodiment, a parallel tool tip positioning assembly can be employed when the tool to be used is a beam of directed energy, etc. Within a parallel tool tip positioning assembly, the nature and configuration of one or more of the relatively-high bandwidth X-axis actuator 108, relatively-high bandwidth Y-axis actuator 110 and relatively-high bandwidth Z-axis actuator 112 will depend upon the tool to be used.

For example, if the tool to be used is a beam of electrons or ions (e.g., generated from an electron or ion source, not shown, as is known in the art), the relatively-high bandwidth X-axis actuator 108, the relatively-high bandwidth Y-axis actuator 110 and the relatively-high bandwidth Z-axis actuator 112 may be provided as one or more magnetic lenses, cylinder lenses, Einzel lenses, quadrupole lenses, multipole lenses, or the like or any combination thereof.

In another example, if the tool to be used is laser light (e.g., manifested as a series of pulses, as a continuous or quasi-continuous beam of laser light, or any combination thereof, generated from one or more laser sources as is known in the art), each of the relatively-high bandwidth X-axis actuator 108 and the relatively-high bandwidth Y-axis actuator 110 may be provided as a galvanometer-driven mirror system, a fast-steering mirror system (e.g., a mirror actuated by a voice-coil motor, a piezoelectric actuator, an electrostrictive actuator, a magnetostrictive actuator, etc.), microelectromechanical systems (MEMS) mirror system, an adaptive optical (AO) system, an electro-optic deflector (EOD) system, an acousto-optic deflector (AOD) system (e.g., arranged and configured to diffract laser light along an axis, such as the X- or Y-axis, in response to an applied RF signal), or the like or any combination thereof. If the tool is to be provided as a focused beam of laser light (in which case the "tool tip" is a region of the focused beam having a fluence sufficiently high to process the workpiece), then a relatively high-bandwidth Z-axis actuator 112 can be provided as one or more AOD systems (e.g., arranged and configured to diffract laser light along two axes, such as the X- and Y-axes, in response to one or more applied, chirped RF signals), a fixed focal-length lens disposed in path in which the laser light propagates (i.e., a "propagation path") that is coupled to an actuator (e.g., a voice-coil) configured to move the lens along the propagation path, a variable-focal length lens (e.g., a zoom lens, or a so-called "liquid lens" incorporating technologies currently offered by COGNEX, VARIOPTIC, etc.) disposed in the propagation path, or the like or any combination thereof.

Figure 3:
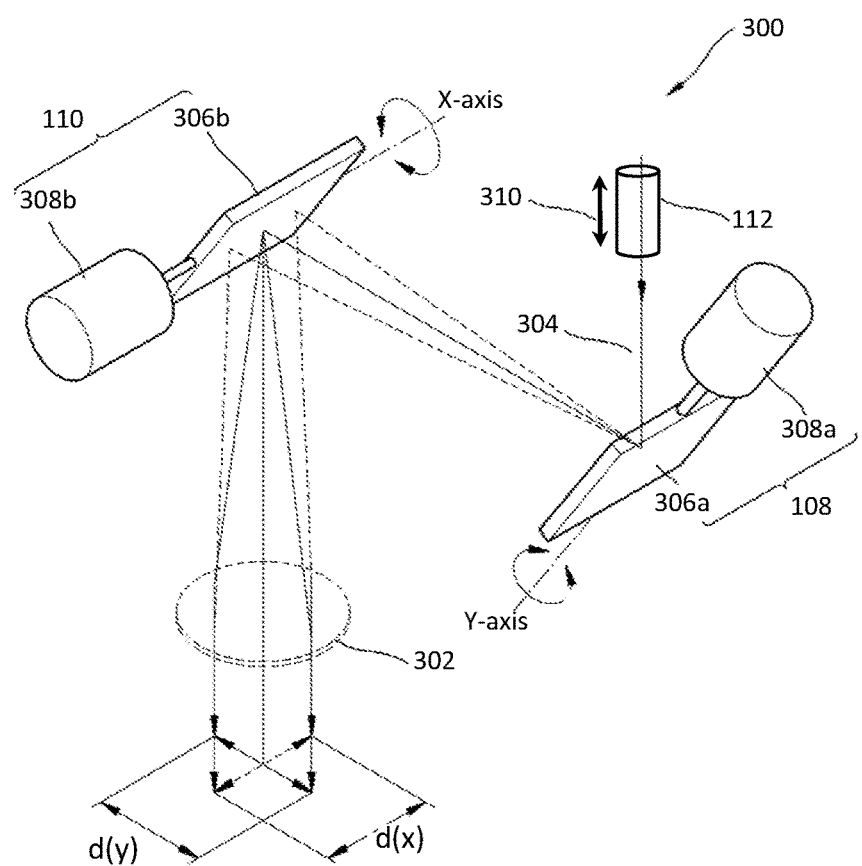
FIG. 3 schematically illustrates a tool tip positioning assembly according to one embodiment of the present invention.

FIG. 3 schematically illustrates one embodiment of a parallel tool tip positioning assembly configured to position or otherwise move a tool tip associated with a focused beam of laser light. Referring to FIG. 3, the parallel tool tip positioning assembly 300 optionally includes a scan lens 302 (e.g., f-theta lens, a telecentric lens, an axicon lens, etc.) configured to focus a beam of laser light propagating along a propagation path 304, which has been deflected by a first galvanometer-driven mirror system (provided here as the relatively-high bandwidth X-axis actuator 108) and a second galvanometer-driven mirror system (provided here as the relatively-high bandwidth Y-axis actuator 110). As illustrated, the first galvanometer-driven mirror system includes a mirror 306a coupled to a motor 308a (e.g., via a shaft), which is configured to rotate the mirror 306a about the Y-axis (e.g., so as to permit deflection of the beam of laser light along the X-axis). Similarly, the second galvanometer-driven mirror system includes a mirror 306b coupled to a motor 308b (e.g., via a shaft), which is configured to rotate the mirror 306b about the X-axis (e.g., so as to permit deflection of the beam of laser light along the Y-axis). As a relatively-high bandwidth Z-axis actuator 112, the parallel tool tip positioning assembly 300 may also include a lens coupled to an actuator (e.g., a voice-coil, not shown), which is configured to move the lens along the propagation path 304 in the directions indicated by the double-arrows at 310.

In some cases, the functionality provided by two or more of the relatively-high bandwidth X-axis actuator 108, the relatively-high bandwidth Y-axis actuator 110 and the relatively-high bandwidth Z-axis actuator 112 can be provided by the same system. For example, systems such as a fast-steering mirror system, a MEMS mirror system, a AO system, etc., can be driven to deflect laser light along the X- and Y-axes. Systems such as a MEMS mirror system, a AO system, and a pair of AOD systems (e.g., one AOD system arranged and configured to diffract laser light along the X-axis and another AOD system arranged and configured to diffract laser light along the Y-axis), can be driven to deflect laser light along the X- and Y-axes and to change the size of a spot illuminated by the laser light at the tooling region (thus effectively changing the position of the beam waist of focused laser light delivered to the workpiece during processing along the Z-axis). Such systems can, therefore, be characterized as a relatively-high bandwidth X-axis actuator 108, a relatively-high bandwidth Y-axis actuator 110, a relatively-high bandwidth Z-axis actuator 112, or any combination thereof, depending upon the manner in which they are provided and driven.

iii. Embodiments Concerning the Hybrid Tool Tip Positioning Assembly

In one embodiment, a hybrid tool tip positioning assembly can be employed when the tool to be used is a beam of directed energy, etc. For example, when provided as a system such as a galvanometer-driven mirror system, a fast-steering mirror system (e.g., a mirror actuated by a voice-coil motor, a piezoelectric actuator, an electrostrictive actuator, a magnetostrictive actuator, etc.), MEMS mirror system, an AO system, an EOD system, an AOD system, etc., the relatively-high bandwidth X-axis actuator 108 and/or the relatively-high bandwidth Y-axis actuator 110 may be mounted to or otherwise mechanically coupled to the relatively-high bandwidth Z-axis actuator 112 (e.g., so as to be movable by the relatively-high bandwidth Z-axis actuator 112). In this example, the relatively-high bandwidth Z-axis actuator 112 may be provided as one or more stages (e.g., direct-drive stages, lead-screw stages, ball-screw stages, belt-driven stages, etc.), each driven by one or more hydraulic cylinders, one or more pneumatic cylinders, one or more servo motors, one or more voice-coil actuators, one or more piezoelectric actuators, one or more electrostrictive elements, or the like or any combination thereof.

In another example, when provided as a system such as a MEMS mirror system, an AO system, a pair of AOD systems, etc., the relatively-high bandwidth Z-axis actuator 112 may be mounted to or otherwise mechanically coupled to one of the relatively-high bandwidth X-axis actuator 108 and the relatively-high bandwidth Y-axis actuator 110 which, in turn, may be mounted to or otherwise mechanically coupled to the other of the relatively-high bandwidth X-axis actuator 108 and the relatively-high bandwidth Y-axis actuator 110. In this example, each of the relatively-high bandwidth X-axis actuator 108 and the relatively-high bandwidth Y-axis actuator 110 may be provided as one or more stages (e.g., direct-drive stages, lead-screw stages, ball-screw stages, belt-driven stages, etc.), each driven by one or more hydraulic cylinders, one or more pneumatic cylinders, one or more servo motors, one or more voice-coil actuators, one or more piezoelectric actuators, one or more electrostrictive elements, or the like or any combination thereof.

C. Additional Comments Concerning the Workpiece and Tool Tip Positioning Assemblies Notwithstanding the above, it should be recognized that any of the relatively-low bandwidth actuators described above as being incorporated within the workpiece positioning assembly (e.g., to position and/or move the workpiece) can, additionally or alternatively, be incorporated as part of the tool tip positioning assembly (e.g., to position and/or move the tool tip). Further, and notwithstanding the above, it should be recognized that the workpiece positioning assembly can, in some embodiments, be provided as any 5-axis workpiece positioning/moving assembly currently available in the industry, such as those found in the AGIEC-HARMILLES laser product line offered by GF MACHINING SOLUTIONS MANAGEMENT SA, the MICROLUTION ML-D offered by MICROLUTION, INC., the LASERTEC product line offered by DMG MORI AKIENGESELLSHAFT/DMG MORI COMPANY LIMITED. In one embodiment, the workpiece positioning assembly can be provided as described in FIGS. 4A-4C of aforementioned U.S. Pat. No. 8,392,002. Likewise, and notwithstanding the above, it should be recognized that the tool tip positioning assembly can, in some embodiments, be provided as any laser scanning or focusing assembly currently available in the industry, such as those found in the 3-axis scanning systems offered by CAMBRIDGE TECHNOLOGY, the MINISCAN, SUPERSCAN, AXIALSCAN and FOCUSSHIFER product lines offered by RAYLASE, the MD-series 3-axis hybrid laser marker product line offered by KEYENCE CORP., the WOMBAT, ANTEATER, ELEPHANT, PRECESSION ELEPHANT and PRECESSION ELEPHANT 2 series of scan heads offered by ARGES GmbH, the LASERTEC product line offered by DMG MORI AKIENGESELLSHAFT/DMG MORI COMPANY LIMITED. Further, and notwithstanding the above, it should be recognized that the tool tip positioning assembly can, in some embodiments, be provided as described in any of U.S. Pat. No. 8,121,717 or International Patent Pub. No. WO 2014/009150 A1, each of which is incorporated herein by reference in its entirety, or as described in FIGS. 5A-5C of aforementioned U.S. Pat. No. 8,392,002.

Having exemplarily described certain components of one embodiment of a multi-axis machine tool above, an algorithm for processing and generating actuator commands to control the multi-axis machine tool, as implemented by the control system 100, now be discussed in greater detail with reference to FIG. 1.

D. Embodiments Concerning Processing of Actuator Commands

Referring to FIG. 1, the control system 100 receives preliminary actuator commands (e.g., obtained or otherwise derived from a computer file or a computer program as discussed above). As shown, the preliminary actuator commands include preliminary linear actuator commands: preliminary X-axis actuator command (i.e., X_prelim.), preliminary Y-axis actuator command (i.e., Y_prelim.), and preliminary Z-axis actuator command (i.e., Z_prelim.); and preliminary rotary actuator commands: preliminary B-axis actuator command (i.e., B_prelim.) and preliminary C-axis actuator command (i.e., C_prelim.). In one embodiment, at least one of the preliminary actuator commands will have non-negligible frequency content that exceeds the threshold frequency of a corresponding relatively-low bandwidth actuator. For example, the preliminary X-axis actuator command (i.e., X_prelim.) may have non-negligible frequency content that exceeds the threshold frequency of a corresponding relatively-low bandwidth X-axis actuator 102, the preliminary Y-axis actuator command (i.e., Y_prelim.) may have non-negligible frequency content that exceeds the threshold frequency of a corresponding relatively-low bandwidth Y-axis actuator 104, the preliminary Z-axis actuator command (i.e., Z_prelim.) may have non-negligible frequency content that exceeds the threshold frequency of a corresponding relatively-low bandwidth Z-axis actuator 106, the preliminary B-axis actuator command (i.e., B_prelim.) may have non-negligible frequency content that exceeds the threshold frequency of a corresponding relatively-low bandwidth B-axis actuator 114, the preliminary C-axis actuator command (i.e., C_prelim.) may have non-negligible frequency content that exceeds the threshold frequency of a corresponding relatively-low bandwidth C-axis actuator 116, or any combination thereof. It should be recognized, however, that any or all of the aforementioned preliminary actuator commands may have non-negligible frequency content that is at or below the threshold frequency of a corresponding relatively-low bandwidth actuator.

The preliminary actuator commands are processed to generate a first set of intermediate linear actuator commands. For example, an inverse kinematic transform 118 is applied to the preliminary X-axis actuator command (i.e., X_prelim.), preliminary Y-axis actuator command (i.e., Y_prelim.), preliminary Z-axis actuator command (i.e., Z_prelim.), preliminary B-axis actuator command (i.e., B_prelim.) and preliminary C-axis actuator command (i.e., C_prelim.) to generate the first set of intermediate linear actuator commands. The first set of intermediate linear actuator commands includes a first intermediate X-axis actuator command (i.e., X0), a first intermediate Y-axis actuator command (i.e., Y0) and a first intermediate Z-axis actuator command (i.e., Z0). The inverse kinematic transform can be applied according to the following equation:

$$\begin{bmatrix} X0 \\ Y0 \\ Z0 \end{bmatrix} = \begin{bmatrix} \cos(C\_prelim.) & \sin(C\_prelim.) & 0 \\ -\sin(C\_prelim.) & \cos(C\_prelim.) & 0 \\ 0 & 0 & 1 \end{bmatrix} \cdot \begin{bmatrix} \cos(B\_prelim.) & 0 & -\sin(B\_prelim.) \\ 0 & 1 & 0 \\ \sin(B\_prelim.) & 0 & \cos(B\_prelim.) \end{bmatrix} \cdot \begin{bmatrix} X\_prelim. \\ Y\_prelim. \\ Z\_prelim. \end{bmatrix}$$

As shown in the equation above, the inverse kinematic transform computes the first set of intermediate linear actuator commands at a fixed reference rotary position. In the example given above, the fixed reference rotary position is 0 degrees.

The preliminary rotary actuator commands (e.g., preliminary B-axis actuator command, B_prelim., and preliminary C-axis actuator command, C_prelim.) are subjected to a processing stage 120 to generate one or more processed rotary actuator commands. In the illustrated embodiment, B_low signifies a processed B-axis actuator command and C_low signifies a processed C-axis actuator command, both of which are generated at processing stage 120. At processing stage 120, a preliminary rotary actuator command can be subjected to one or more processes that, for example, includes applying one or more suitable filters to the preliminary rotary actuator command, modifying the preliminary rotary actuator command according to one or more suitable algorithms, decimating the preliminary rotary actuator command, applying one or more low-order interpolation to the preliminary rotary actuator command, or the like or any combination thereof. Examples of suitable filters include digital filters, low pass filters, Butterworth filters, or the like or any combination thereof. Examples of suitable algorithms include an auto-regressive moving-average algorithm, or the like. A processed rotary actuator command corresponds to a preliminary rotary actuator command, but does not have any (or has only negligible amounts of) frequency content that exceeds the threshold frequency of a corresponding rotary actuator. Thus, the processed B-axis actuator command (i.e., B_low) does not have any (or has only negligible amounts of) frequency content that exceeds the threshold frequency of the relatively-low bandwidth B-axis actuator 114, the processed C-axis actuator command (i.e., C_low) does not have any (or has only negligible amounts of) frequency content that exceeds the threshold frequency of the relatively-low bandwidth C-axis actuator 116, etc. As used herein, each of the above-noted processed rotary actuator commands is also referred to herein as "low-frequency content rotary actuator commands" or, more generally, "low-frequency content actuator commands."

The first set of intermediate linear actuator commands and the processed rotary commands are processed to generate a second set of intermediate linear actuator commands. For example, a forward kinematic transform 122 is applied to the first intermediate X-axis actuator command (i.e., X0), first intermediate Y-axis actuator command (i.e., Y0), first intermediate Z-axis actuator command (i.e., Z0), the processed B-axis actuator command (i.e., B_low) and the processed C-axis actuator command (i.e., C_low) to generate the second set of intermediate linear actuator commands. The second set of intermediate linear actuator commands includes a second intermediate X-axis actuator command (i.e., X1), a second intermediate Y-axis actuator command (i.e., Y1) and a second intermediate Z-axis actuator command (i.e., Z1). The forward kinematic transform can be applied according to the following equation:

$$\begin{bmatrix} X1 \\ Y1 \\ Z1 \end{bmatrix} = \begin{bmatrix} \cos(B\_low) & 0 & \sin(B\_low) \\ 0 & 1 & 0 \\ -\sin(B\_low) & 0 & \cos(B\_low) \end{bmatrix} \cdot \begin{bmatrix} \cos(C\_low) & -\sin(C\_low) & 0 \\ \sin(C\_low) & \cos(C\_low) & 0 \\ 0 & 0 & 1 \end{bmatrix} \cdot \begin{bmatrix} X0 \\ Y0 \\ Z0 \end{bmatrix}$$

The second set of intermediate linear actuator commands (e.g., second intermediate X-axis actuator command, X1, second intermediate Y-axis actuator command, Y1, and second intermediate Z-axis actuator command, Z1) are subjected to a processing stage 124 to generate a first set of processed linear actuator commands. The first set of processed linear actuator commands can include a low-frequency content X-axis actuator command (i.e. X_low), a low-frequency content Y-axis actuator command (i.e. Y_low) and a low-frequency content Z-axis actuator command (i.e. Z_low). At processing stage 124, a second intermediate linear actuator command can be subjected to one or more processes that, for example, includes applying one or more suitable filters to the second intermediate linear actuator command, modifying the second intermediate linear actuator command according to one or more suitable algorithms, decimating the second intermediate linear actuator command, applying one or more low-order interpolation to the second intermediate linear actuator command, or the like or any combination thereof. Examples of suitable filters include digital filters, low pass filters, Butterworth filters, or the like or any combination thereof. Examples of suitable algorithms include an auto-regressive moving-average algorithm, or the like. A processed linear actuator command corresponds to a preliminary linear actuator command, but does not have any (or has only negligible amounts of) frequency content that exceeds the threshold frequency of a corresponding linear actuator. Thus, the low-frequency content X-axis actuator command (i.e., X_low) does not have any (or has only negligible amounts of) frequency content that exceeds the threshold frequency of the relatively-low bandwidth X-axis actuator 102, the low-frequency content Y-axis actuator command (i.e., Y_low) does not have any (or has only negligible amounts of) frequency content that exceeds the threshold frequency of the relatively-low bandwidth Y-axis actuator 104 and the low-frequency content Z-axis actuator command (i.e., Z_low) does not have any (or has only negligible amounts of) frequency content that exceeds the threshold frequency of the relatively-low bandwidth Z-axis actuator 106.

The low-frequency content linear actuator commands (e.g., X_low, Y_low and Z_low) are subtracted from corresponding actuator commands in the second set of intermediate linear actuator commands to generate a second set of processed linear actuator commands. The second set of processed linear actuator commands can include a high-frequency content X-axis actuator command (i.e. X_high), a high-frequency content Y-axis actuator command (i.e. Y_high) and a high-frequency content Z-axis actuator command (i.e. Z_high). For example, the low-frequency content X-axis actuator command (i.e., X_low) can be subtracted from the second intermediate X-axis actuator command (i.e., X1) to yield the high-frequency content X-axis actuator command (i.e. X_high), the low-frequency content Y-axis actuator command (i.e., Y_low) can be subtracted from the second intermediate Y-axis actuator command (i.e., Y1) to yield the high-frequency content Y-axis actuator command (i.e. Y_high) and the low-frequency content Z-axis actuator command (i.e., Z_low) can be subtracted from the second intermediate Z-axis actuator command (i.e., Z1) to yield the high-frequency content Z-axis actuator command (i.e. Z_high). The subtraction discussed above may be implemented at a summer 126, which can be implemented in any suitable or desired manner known in the art. Typically, the high-frequency content X-axis actuator command (i.e., X_high) has a frequency content that exceeds the threshold frequency of the relatively-low bandwidth X-axis actuator 102, but that is at or below the threshold frequency of the relatively-high bandwidth X-axis actuator 108. Likewise, the high-frequency content Y-axis actuator command (i.e., Y_high) has a frequency content that exceeds the threshold frequency of the relatively-low bandwidth Y-axis actuator 104, but that is at or below the threshold frequency of the relatively-high bandwidth Y-axis actuator 110; and the high-frequency content Z-axis actuator command (i.e., Z_high) has a frequency content that exceeds the threshold frequency of the relatively-low bandwidth Z-axis actuator 106, but that is at or below the threshold frequency of the relatively-high bandwidth Z-axis actuator 112.

Ultimately, and as shown, the low-frequency content X-axis actuator command (i.e., X_low), the low-frequency content Y-axis actuator command (i.e., Y_low), the low-frequency content Z-axis actuator command (i.e., Z_low), the high-frequency content X-axis actuator command (i.e., X_high), the high-frequency content Y-axis actuator command (i.e., Y_high), the high-frequency content Z-axis actuator command (i.e., Z_high), the low-frequency content B-axis actuator command (i.e., B_low) and the low-frequency content C-axis actuator command (i.e., C_low) are output, respectively, to the relatively-low bandwidth X-axis actuator 102, relatively-low bandwidth Y-axis actuator 104, relatively-low bandwidth Z-axis actuator 106, relatively-high bandwidth X-axis actuator 108, relatively-high bandwidth Y-axis actuator 110, relatively-high bandwidth Z-axis actuator 112, B-axis actuator 114 and C-axis actuator 116.

Although not illustrated, the control system 100 may include one or more delay buffers to compensate for any processing or transport delays caused by the generation of the low-frequency content X-axis actuator command (i.e., X_low), the low-frequency content Y-axis actuator command (i.e., Y_low), the low-frequency content Z-axis actuator command (i.e., Z_low), the high-frequency content X-axis actuator command (i.e., X_high), the high-frequency content Y-axis actuator command (i.e., Y_high), the high-frequency content Z-axis actuator command (i.e., Z_high), the low-frequency content B-axis actuator command (i.e., B_low) and the low-frequency content C-axis actuator command (i.e., C_low) and/or the output of any of these actuator commands to their respective actuator, so that the actuator commands can be output in a synchronized or otherwise coordinated manner. Upon outputting the actuator commands in a synchronized or otherwise coordinated manner, the actuators essentially react or respond in a similarly synchronized or otherwise coordinated manner to impart relative movement between the tool tip and the workpiece in manner that moves the tooling region along a path that matches or otherwise corresponds to the desired trajectory.

Generally, the control system 100 may be implemented by one or more controllers that are communicatively coupled (e.g., over one or more wired or wireless communications links, such as USB, Ethernet, Firewire, Wi-Fi, RFID, NFC, Bluetooth, Li-Fi, or the like or any combination thereof) to one or more components of the multi-axis machine tool (e.g., one or more of the aforementioned actuators, one or more components controlling or otherwise affecting an operation of the tool, or the like or any combination thereof). Generally, a controller can be characterized as including one or more processors configured to process and generate the aforementioned actuator commands upon executing instructions. A processor can be provided as a programmable processor (e.g., including one or more general purpose computer processors, microprocessors, digital signal processors, or the like or any combination thereof) configured to execute the instructions. Instructions executable by the processor(s) may be implemented software, firmware, etc., or in any suitable form of circuitry including programmable logic devices (PLDs), field-programmable gate arrays (FPGAs), field-programmable object arrays (FPOAs), application-specific integrated circuits (ASICs)—including digital, analog and mixed analog/digital circuitry—or the like, or any combination thereof. Execution of instructions can be performed on one processor, distributed among processors, made parallel across processors within a device or across a network of devices, or the like or any combination thereof. In one embodiment, a controller includes tangible media such as computer memory, which is accessible (e.g., via one or more wired or wireless communications links) by the processor. As used herein, "computer memory" includes magnetic media (e.g., magnetic tape, hard disk drive, etc.), optical discs, volatile or non-volatile semiconductor memory (e.g., RAM, ROM, NAND-type flash memory, NOR-type flash memory, SONOS memory, etc.), etc., and may be accessed locally, remotely (e.g., across a network), or a combination thereof. Generally, the instructions may be stored as computer software (e.g., executable code, files, instructions, etc., library files, etc.), which can be readily authored by artisans, from the descriptions provided herein, e.g., written in C, C++, Visual Basic, Java, Python, Tcl, Perl, Scheme, Ruby, etc. Computer software is commonly stored in one or more data structures conveyed by computer memory.

Although not shown, one or more drivers (e.g., RF drivers, servo drivers, line drivers, power sources, etc.) are communicatively coupled to an input of one or more of the aforementioned actuators, one or more components controlling or otherwise affecting an operation of the tool, or the like or any combination thereof. Each driver typically includes an input to which the controller is communicatively coupled. The controller is thus operative to generate one or more control signals (e.g., actuator commands, tool control commands, etc.) which can be transmitted to the input(s) of one or more drivers associated with one or more components of the multi-axis machine tool. Upon receiving a control signal, a driver typically causes an electric current to be supplied to the component to which it is coupled (e.g., actuator, tool, etc.) in order to operate the component and produce an effect that corresponds to the command signal. Thus, components such as the aforementioned actuators, the tool, etc., are responsive to command signals (e.g., actuator commands, tool control commands, etc.) generated and output by the controller.

In view of the above, it will be appreciated that the control system 100 can be used to continuously provide synchronized and coordinated operation of the relatively-low bandwidth actuators (e.g., having a relatively large range of motion) and relatively-high bandwidth actuators of the multi-axis machine tool (e.g., having a relatively small range of motion) to position or otherwise move a tooling region relative to the workpiece (e.g., in a manner that accurately and reliably corresponds to a desired trajectory). While the control system 100 can accurately position the tooling region relative to the workpiece (e.g., according to the desired trajectory), it is possible that the tooling angle ultimately manifested at any point during workpiece processing can deviate from a reference tooling angle (e.g., as specified, either explicitly or implicitly, by the trajectory). Generally, the deviation in tooling angle arises if a high-frequency content linear actuator command has frequency content exceeding the threshold frequency of a rotary actuator that is not part of a set of redundant rotary actuators. Such tooling angle deviations can, however, be pre-calculated (e.g., based on the characteristics of the actuators in the multi-axis machine tool, based on the desired trajectory, etc.) and compensated for (either completely or partially) during workpiece processing (e.g., by adjusting the speed with which the tooling region is moved relative to the workpiece, by adjusting the processing at one or more of processing stages 120 and 124).

Figure 4:
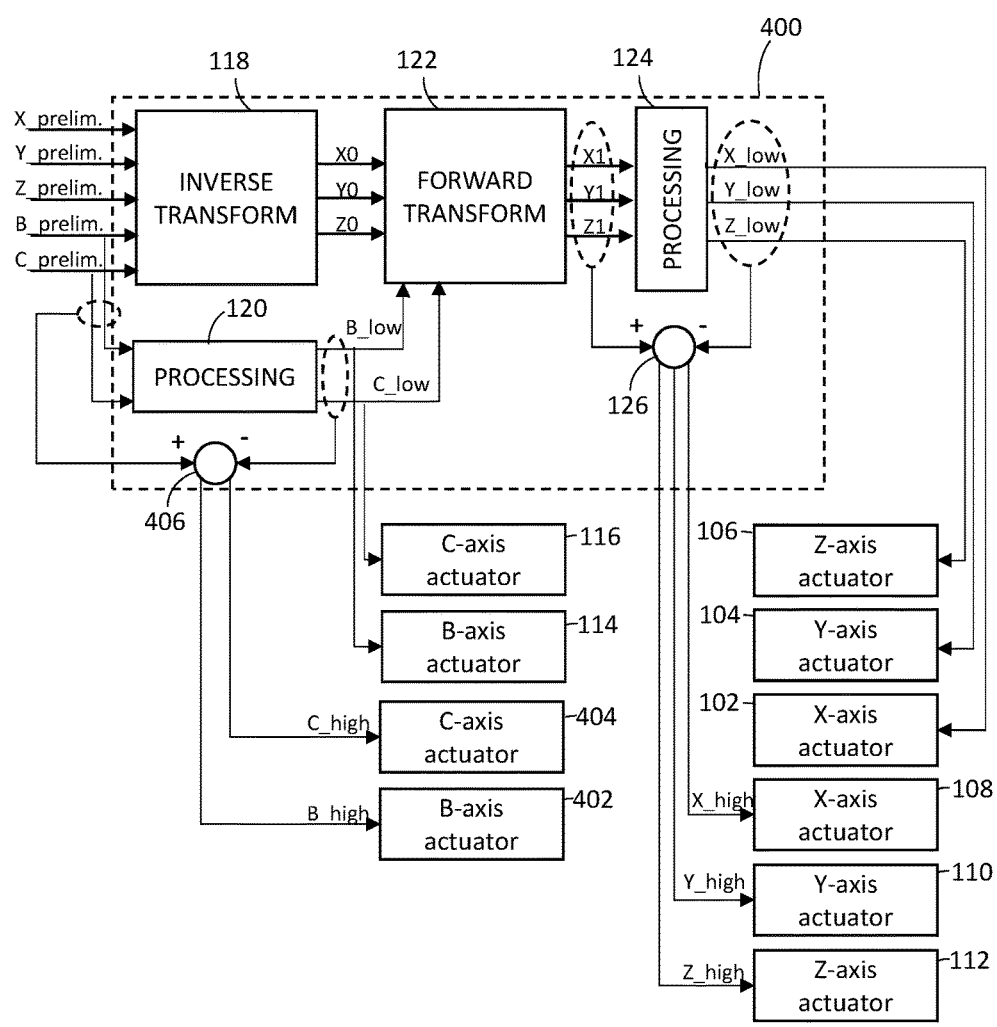
FIG. 4 is a block diagram schematically illustrating a control system for controlling a multi-axis machine tool according to another embodiment.

III. Controlling a Multi-Axis Machine Tool Having Axially-Complementary Actuators and Redundant Rotary Actuators FIG. 4 is a block diagram schematically illustrating a control system 400 for controlling a multi-axis machine tool which, according to one embodiment, includes actuators such as those exemplarily discussed above with respect to FIGS. 1 to 3. In the current embodiment, however, the multi-axis machine tool may additionally include a B-axis actuator 402, a C-axis actuator 404, or the B-axis actuator 402 and the C-axis actuator 404. The threshold frequency of the B-axis actuator 402 is higher than the threshold frequency of the B-axis actuator 114. Accordingly, the B-axis actuator 114 can also be referred to herein as a "relatively-low bandwidth B-axis actuator" and the B-axis actuator 402 can also be referred to herein as a "relatively-high bandwidth B-axis actuator." Likewise, the threshold frequency of the C-axis actuator 404 is higher than the threshold frequency of the C-axis actuator 116. Accordingly, the C-axis actuator 116 can also be referred to herein as a "relatively-low bandwidth C-axis actuator" and the C-axis actuator 404 can also be referred to herein as a "relatively-high bandwidth B-axis actuator."

The relatively-low and relatively-high bandwidth B-axis actuators 114 and 402, respectively, constitute a set of redundant actuators (i.e., a set of redundant B-axis actuators). Likewise, a set of redundant actuators is constituted by each pair of the relatively-low and relatively-high bandwidth C-axis actuators 116 and 404, respectively (i.e., a set of redundant C-axis actuators). Although the illustrated embodiment describes a multi-axis machine tool having a set of redundant actuators constituted by only two rotary actuators, it will be appreciated that the multi-axis machine tool may be further equipped with one or more additional rotary actuators arranged or configured to impart movement along any of the B- or C-axes, so that any set of redundant actuators may include three or more rotary actuators.

In one embodiment, the relatively-high bandwidth B-axis actuator 402, considered with one or more actuators within the set of redundant X-axis actuators and/or one or more within the set of redundant Z-axis actuators, constitutes a set of axially-complementary actuators. In another embodiment, the relatively-high bandwidth C-axis actuator 404, considered with one or more actuators within the set of redundant X-axis actuators and/or one or more within the set of redundant Y-axis actuators, constitutes a set of axially-complementary actuators. In yet another embodiment, the relatively-high bandwidth B-axis and C-axis actuators 402 and 404, respectively, considered with one or more actuators within the set of redundant X-axis actuators, one or more actuators within the set of redundant Y-axis actuators and/or one or more within the set of redundant Z-axis actuators, constitutes a set of axially-complementary actuators.

A. Embodiments Concerning the Tool Tip Positioning Assembly

In one embodiment, one or both of the relatively-high bandwidth B-axis actuator 402 and the relatively-high bandwidth C-axis actuator 404 may be incorporated within a tool tip positioning assembly as exemplarily described above, so that the resulting tool tip positioning assembly can be configured to position or otherwise move a tool tip associated with the multi-axis machine tool along B-axis and/or the C-axis in addition to the X-axis, Y-axis, Z-axis, or any combination thereof, either simultaneously or non-simultaneously. It should be recognized, however, that one or more of the relatively-high bandwidth X-axis actuator 108, relatively-high bandwidth Y-axis actuator 110, relatively-high bandwidth Z-axis actuator 112, relatively-high bandwidth B-axis actuator 402 and the relatively-high bandwidth C-axis actuator 404 may be omitted from the tool tip positioning assembly, as suitable or if otherwise desired. As mentioned above, a tool tip positioning assembly including one or both of the relatively-high bandwidth B-axis actuator 402 and the relatively-high bandwidth C-axis actuator 404 can be characterized as a "serial tool tip positioning assembly," as a "parallel tool tip positioning assembly" or a "hybrid tool tip positioning assembly" (e.g., combining characteristics unique to the serial tool tip positioning assembly and the parallel tool tip positioning assembly).

i. Embodiments Concerning the Serial Tool Tip Positioning Assembly

Within a serial tool tip positioning assembly (e.g., as described above), any of the relatively-high bandwidth B-axis actuator 402 and the relatively-high bandwidth C-axis actuator 404 may include one or more components (e.g., stages, fixtures, chucks, rails, bearings, brackets, clamps, straps, bolts, screws, pins, retaining rings, ties, etc., not shown) to permit the relatively-high bandwidth B-axis actuator 402 and the relatively-high bandwidth C-axis actuator 404 to be mounted or otherwise mechanically coupled to one another or to any of the aforementioned actuators included within the serial tool tip.

Each of the relatively-high bandwidth B-axis actuator 402 and relatively-high bandwidth C-axis actuator 404 in the serial tool tip positioning assembly may be provided as one or more rotary stages (e.g., direct-drive stages, lead-screw stages, ball-screw stages, belt-driven stages, etc.), each driven by one or more hydraulic cylinders, one or more pneumatic cylinders, one or more servo motors, one or more voice-coil actuators, one or more piezoelectric actuators, one or more electrostrictive elements, or the like or any combination thereof. Moreover, any of the relatively-high bandwidth B-axis actuator 402 and relatively-high bandwidth C-axis actuator 404 in the serial tool tip positioning assembly may be configured to provide continuous or stepped (incremental) motion.

A tool fixture (not shown) may be mechanically coupled to the serial tool tip positioning assembly at the relatively-high bandwidth Z-axis actuator 112 (as discussed above), at the relatively-high bandwidth B-axis actuator 402 or at the relatively-high bandwidth C-axis actuator 404 to hold, retain, carry, etc., a mechanical structure (e.g., a router bit, a drill bit, a tool bit, a grinding bit, a blade, etc.), or other structure from which a stream or jet of matter is ejected (e.g., a nozzle, head, etc.), in any suitable or desired manner.

ii. Embodiments Concerning the Parallel Tool Tip Positioning Assembly

In one embodiment, the parallel tool tip positioning assembly includes a relatively-high bandwidth C-axis actuator 404, in addition to one or more of the relatively-high bandwidth X-axis actuator 108, the relatively-high bandwidth Y-axis actuator 110, and the relatively-high bandwidth Z-axis actuator 112, as exemplarily described above. In this case, the configuration of the relatively-high bandwidth C-axis actuator 404 will depend upon the tool to be used. Example embodiments discussed below relate to instances where the tool to be used includes laser light (e.g., manifested as a series of pulses, as a continuous or quasi-continuous beam of laser light, or any combination thereof, generated from one or more laser sources as is known in the art).

When the tool to be used is laser light, the laser light can be directed (e.g., along the aforementioned propagation path) to illuminate a portion of the workpiece at or near the tooling region. When viewed on the surface of the workpiece, or when otherwise viewed in a plane that is orthogonal to a portion of the propagation path intersecting the workpiece at the tooling region, the spatial intensity distribution of laser light at the illuminated portion (also referred to as a "spot") can be characterized as having a circular shape or a non-circular shape. Examples of non-circular shapes include elliptical shapes, triangular shapes, square shapes, rectangular shapes, irregular shapes, etc. Circular or non-circular spot shapes can be created using one or more beam-cropping apertures, diffractive optical elements, AOD systems, prisms, lenses, etc. (which may be included as part of the multi-axis machine tool and disposed within the propagation path), in any suitable manner known in the art, or can be created as result of the beam of laser light illuminating a surface of the workpiece at the tooling region that is either non-planar or is not orthogonal to the portion of the propagation path intersecting the workpiece at the tooling region, or any combination thereof.

In view of the above, the relatively-high bandwidth C-axis actuator 404 can be disposed in the propagation path at any suitable or desired location that is optically "upstream" or optically "downstream" of any of the relatively-high bandwidth X-axis actuator 108 or the relatively-high bandwidth Y-axis actuator 110 in the parallel tool tip positioning assembly (e.g., the parallel tool tip positioning assembly 300). In one embodiment, the relatively-high bandwidth C-axis actuator 404 can be provided as a microelectromechanical systems (MEMS) mirror system, an adaptive optical (AO) system, or any combination thereof, and be configured to change the shape of the spatial intensity distribution relative to the propagation path in a manner that effectively changes the orientation of the spatial intensity distribution of the incident beam of laser light. In another embodiment, the relatively-high bandwidth C-axis actuator 404 can be provided as one or more prisms, which may be rotated (e.g., about an axis along which the propagation path extends) or otherwise moved by an actuator to change the orientation of the spatial energy distribution relative to the propagation path. In one embodiment, the relatively-high bandwidth C-axis actuator 404 can be provided as described in U.S. Pat. No. 6,362,454, which is incorporated herein by reference. In yet another embodiment, the relatively-high bandwidth C-axis actuator 404 can be provided as one or more AOD systems (e.g., arranged and configured to diffract laser light along two axes, such as the X- and Y-axes, in response to one or more applied, chirped RF signals).

In some cases, the functionality provided by the relatively-high bandwidth C-axis actuator 404 and one or more of the relatively-high bandwidth X-axis actuator 108, the relatively-high bandwidth Y-axis actuator 110 and the relatively-high bandwidth Z-axis actuator 112 can be provided by the same system. For example, systems such as a MEMS mirror system, a AO system, and a pair of AOD systems (e.g., one AOD system arranged and configured to diffract laser light along the X-axis and another AOD system arranged and configured to diffract laser light along the Y-axis), can be driven to deflect laser light along the X- and Y-axes, to change the size of a spot illuminated by the laser light at the tooling region (thus effectively changing the position of the beam waist of focused laser light delivered to the workpiece during processing along the Z-axis), and to change the orientation of the spatial energy distribution of a beam of laser light relative to the propagation path. Such systems can, therefore, be characterized as a relatively-high bandwidth X-axis actuator 108, a relatively-high bandwidth Y-axis actuator 110, a relatively-high bandwidth Z-axis actuator 112, a relatively-high bandwidth C-axis actuator 404, or any combination thereof, depending upon the manner in which they are provided and driven.

iii. Embodiments Concerning the Hybrid Tool Tip Positioning Assembly

In one embodiment, a hybrid tool tip positioning assembly includes a relatively-high bandwidth B-axis actuator 402, in addition to one or more of the relatively-high bandwidth X-axis actuator 108, the relatively-high bandwidth Y-axis actuator 110, the relatively-high bandwidth Z-axis actuator 112, and the relatively-high bandwidth C-axis actuator 404 as exemplarily described above in connection with the serial tool tip positioning assembly. In this case, the relatively-high bandwidth B-axis actuator 402 is attached to and movable by one or more of the aforementioned actuators so as to be movable along the X-axis, Y-axis, Z-axis, C-axis or any combination thereof, either simultaneously or non-simultaneously. It will be appreciated that the configuration of the relatively-high bandwidth B-axis actuator 402 will depend upon the tool to be used. Example embodiments discussed below relate to instances where the tool to be used includes laser light (e.g., manifested as a series of pulses, as a continuous or quasi-continuous beam of laser light, or any combination thereof, generated from one or more laser sources as is known in the art). When the tool to be used is laser light, the laser light can be directed (e.g., along the aforementioned propagation path) to illuminate a portion of the workpiece at or near the tooling region.

Figure 5:
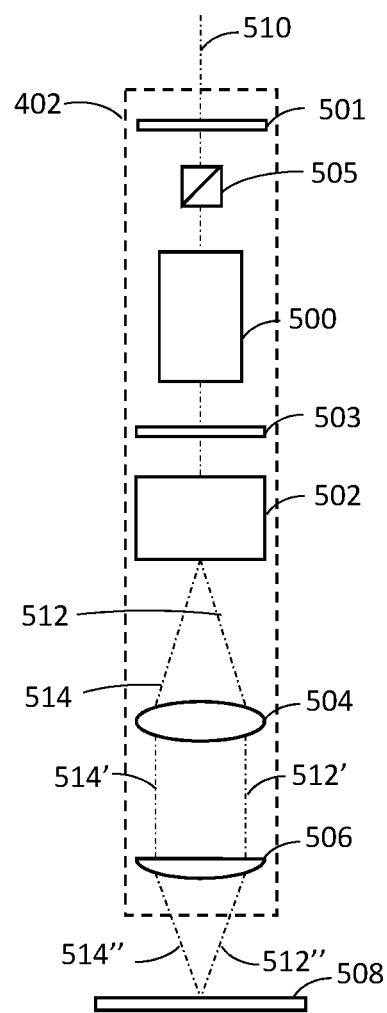
FIG. 5 schematically illustrates a portion of a tool tip positioning assembly according to one embodiment of the present invention.

Referring now to FIG. 5, the relatively-high bandwidth B-axis actuator 402 can include a first AOD system 500 arranged and configured to diffract laser light along one axis (e.g., along the X-axis) in response to an applied RF signal, and a second AOD system 502 arranged and disposed optically "downstream" of the first AOD system 500 and configured to diffract laser light along another axis (e.g., along the Y-axis) in response to an applied RF signal. The relatively-high bandwidth B-axis actuator 402 can include additional components, such as half-wave plates 501 and 503, and a polarizing beam splitter 505. When driven, the first AOD system 500 and the second AOD system 502 can deflect position or otherwise move an incident beam of laser light 510 to any number of positions (e.g., as indicated by deflected beams 512 and 514) within a scan range associated with the first AOD system 500 and second AOD system 502. Deflected beams, such as deflected beams 512 and 514, can be characterized by a deflection angle measured relative to the incident beam of laser light 510.

The relatively-high bandwidth B-axis actuator 402 can also include a set of lenses (e.g., relay lens 504 and scan lens 506) disposed optically downstream of the second AOD system 502. Relay lens 504 is used to transform the deflection angle of any deflected beams (e.g., deflected beams 512 and 514) to laterally displaced beams (e.g., laterally displaced beams 512' and 514') on the scan lens 506. The scan lens 506 then transforms any laterally displaced beams (e.g., laterally displaced beams 512' and 514') to incident beams (e.g., incident beams 512" and 514") which are delivered to the workpiece (illustrated here at 508). As illustrated, incident beams 512" and 514" illuminate the workpiece at the same (or at least substantially the same) spot or tooling region, but at different tooling angles.

Based on the construction of the relatively-high bandwidth B-axis actuator 402 described above, it should be recognized that the speed with which the tooling angle of an incident beam of laser light can be changed corresponds to the refresh rate of the first and second AOD systems 500 and 502. The maximum tooling angle is proportional to the AOD deflection range and the focal length of the relay lens 504, and is inversely-proportional to the focal length of scan lens 506. The distance between the relay lens 504 and the scan lens 506 can be adjusted to ensure that different incident beams can be delivered to the same tooling region on the workpiece 508.

B. Additional Comments Concerning the Tool Tip Positioning Assembly

Notwithstanding the above, it should be recognized that any of the relatively-low bandwidth actuators described above as being incorporated within the workpiece positioning assembly (e.g., to position and/or move the workpiece) can, additionally or alternatively, be incorporated as part of a tool tip positioning assembly (e.g., to position and/or move the tool tip) that includes the relatively-high bandwidth B-axis actuator 402 or the relatively-high bandwidth C-axis actuator 404. Further, and notwithstanding the above, it should be recognized that the tool tip positioning assembly can, in some embodiments, be provided as any laser scanning or focusing assembly currently available in the industry, such as those found in the PRECESSION ELEPHANT and PRECESSION ELEPHANT 2 series of scan heads offered by ARGES GmbH. Further, and notwithstanding the above, it should be recognized that the tool tip positioning assembly can, in some embodiments, be provided as described in International Patent Pub. No. WO 2014/009150 A1, which is incorporated herein by reference in its entirety.

C. Embodiments Concerning Processing of Actuator Commands

Generally, the control system 400 may be implemented by one or more controllers as exemplarily described with respect to the control system 100, and operation of the control system 400 is the same as the operation of the control system 100 discussed above with respect to FIG. 1 with the exception of some additional processes and operations introduced to account for the presence of the relatively-high bandwidth B-axis actuator 402, the relatively-high bandwidth C-axis actuator 404, or a combination thereof. These additional processes and operations will now be described below.

The low-frequency content rotary actuator commands (e.g., B_low and C_low) are subtracted corresponding actuator commands in the preliminary rotary actuator commands (e.g., preliminary B-axis actuator command, B_prelim., and preliminary C-axis actuator command, C_prelim.) to generate one or more further-processed rotary actuator commands. For example, the low-frequency content B-axis actuator command (i.e., B_low) can be subtracted from the preliminary B-axis actuator command (i.e., B_prelim.) to yield, as a further-processed rotary actuator command, a high-frequency content B-axis actuator command (i.e. B_high). Similarly, the low-frequency content C-axis actuator command (i.e., C_low) can be subtracted from the preliminary C-axis actuator command (i.e., C_prelim.) to yield, as a further-processed rotary actuator command, a high-frequency content C-axis actuator command (i.e. C_high). The subtraction discussed above may be implemented at a summer 406, which can be implemented in any suitable or desired manner known in the art. Typically, the high-frequency content B-axis actuator command (i.e., B_high) has a frequency content that exceeds the threshold frequency of the relatively-low bandwidth B-axis actuator 114, but that is at or below the threshold frequency of the relatively-high bandwidth B-axis actuator 402. Likewise, the high-frequency content C-axis actuator command (i.e., C_high) has a frequency content that exceeds the threshold frequency of the relatively-low bandwidth C-axis actuator 116, but that is at or below the threshold frequency of the relatively-high bandwidth C-axis actuator 404.

Ultimately, and as shown, the high-frequency content B-axis actuator command (i.e., B_high), the high-frequency content C-axis actuator command (i.e., C_high), or any combination thereof, are output to respective one of the relatively-high bandwidth B-axis actuator 402 and the relatively-high bandwidth C-axis actuator 404. Although not illustrated, the control system 400 may include one or more delay buffers to compensate for any processing or transport delays caused by the generation of the high-frequency content B-axis actuator command (i.e., B_high), the high-frequency content C-axis actuator command (i.e., C_high) and/or the output of any of these actuator commands to their respective actuator, so that the illustrated actuator commands can be output in a synchronized or otherwise coordinated manner. Upon outputting the actuator commands in a synchronized or otherwise coordinated manner, the actuators essentially react or respond in a similarly synchronized or otherwise coordinated manner to impart relative movement between the tool tip and the workpiece in manner that moves the tooling region along a path that matches or otherwise corresponds to the desired trajectory.

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention. Accordingly, all such modifications are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:

1. A method for controlling a multi-axis machine tool configured to process a workpiece using a tool, the multi-axis machine tool comprising a rotary actuator configured to impart relative movement between the tool and the workpiece about a first axis, a first linear actuator configured to impart relative movement between the tool and the workpiece along the first axis, a second linear actuator configured to impart relative movement between the tool and the workpiece along a second axis and a third linear actuator configured to impart relative movement between the tool and the workpiece along at least one selected from the group consisting of the first axis and the second axis, wherein the third linear actuator is configured to impart relative movement between the tool and the workpiece at a bandwidth that is higher than a bandwidth with which relative movement between the tool and the workpiece can be imparted by the first linear actuator or the second linear actuator, the method comprising:

receiving a preliminary rotary actuator command, the preliminary rotary actuator command having frequency content exceeding a bandwidth of the rotary actuator;
generating a processed rotary actuator command based, at least in part, on the preliminary rotary actuator command, the processed rotary actuator command having frequency content within a bandwidth of the rotary actuator;
generating a first linear actuator command, second linear actuator command and a third linear actuator command based, at least in part, on the processed rotary actuator command;
outputting the processed rotary actuator command to the rotary actuator;
outputting the first linear actuator command to the first linear actuator;
outputting the second linear actuator command to the second linear actuator; and
outputting the third linear actuator command to the third linear actuator.

2. The method of claim 1, wherein the second axis is orthogonal to the first axis.

3. The method of claim 1, wherein generating the processed rotary actuator command comprises filtering the preliminary rotary actuator command.

4. The method of claim 1, wherein generating the first linear actuator command and the second linear actuator command comprises:

generating a set of intermediate linear actuator commands based on the preliminary rotary actuator command and at least one preliminary linear actuator command; and
processing the set of intermediate linear actuator commands based, at least in part, on the processed rotary actuator command.

5. The method of claim 1, further comprising processing the workpiece with the tool while imparting relative movement about the first axis.

6. The method of claim 5, wherein processing the workpiece with the tool comprises directing laser light to the workpiece.

7. A controller for controlling a multi-axis machine tool configured to process a workpiece using a tool, the multi-axis machine tool comprising a rotary actuator configured to impart relative movement between the tool and the workpiece about a first axis, a first linear actuator configured to impart relative movement between the tool and the workpiece along the first axis and a second linear actuator configured to impart relative movement between the tool and the workpiece along a second axis, the controller comprising:

at least one processor and computer memory accessible to the at least one processor, the computer memory having instructions stored thereon which, when executed by the at least one processor, cause the controller to:
generate a processed rotary actuator command based, at least in part, on a preliminary rotary actuator command having frequency content exceeding a bandwidth of the rotary actuator, the processed rotary actuator command having frequency content within a bandwidth of the rotary actuator;
apply an inverse kinematic transform to the preliminary rotary actuator command, a preliminary first linear actuator command and a preliminary second linear actuator command to generate an intermediate first linear actuator command and an intermediate second linear actuator command;
generate a first linear actuator command and a second linear actuator command based, at least in part, on the processed rotary actuator command, the intermediate first linear actuator command and the intermediate second linear actuator command; and output the processed rotary actuator command, the first linear actuator command and the second linear actuator command.

8. A multi-axis machine tool, comprising:
a tool configured to process a workpiece;
a first rotary actuator configured to impart relative movement between the tool and the workpiece about a first axis;
a first linear actuator configured to impart relative movement between the tool and the workpiece along the first axis;
a second linear actuator configured to impart relative movement between the tool and the workpiece along a second axis;
a third linear actuator configured to impart relative movement between the tool and the workpiece along at least one selected from the group consisting of the first axis, the second axis and a third axis, wherein the third linear actuator is configured to impart relative movement between the tool and the workpiece at a bandwidth that is higher than a bandwidth with which relative movement between the tool and the workpiece can be imparted by the first linear actuator or the second linear actuator; and
a controller operatively coupled to the first rotary actuator, the first linear actuator and the second linear actuator, the controller configured to:
generate a processed rotary actuator command based, at least in part, on a preliminary rotary actuator command having frequency content exceeding a bandwidth of the rotary actuator, the processed rotary actuator command having frequency content within a bandwidth of the rotary actuator;
generate a first linear actuator command and a second linear actuator command based, at least in part, on the processed rotary actuator command;
output the processed rotary actuator command to the rotary actuator;
output the first linear actuator command to the first linear actuator; and
output the second linear actuator command to the second linear actuator.

9. The multi-axis machine tool of claim 8, further comprising a second rotary actuator configured to impart relative movement between the tool and the workpiece about the first axis, wherein a bandwidth of the second rotary actuator is higher than a bandwidth of the first rotary actuator.

10. The multi-axis machine tool of claim 8, further comprising a laser source and the tool includes a focused beam of laser light.

11. A multi-axis machine tool, comprising:
a tool configured to process a workpiece, wherein the tool includes a waterjet;
a first rotary actuator configured to impart relative movement between the tool and the workpiece about a first axis;
a first linear actuator configured to impart relative movement between the tool and the workpiece along the first axis;
a second linear actuator configured to impart relative movement between the tool and the workpiece along a second axis; and
a controller operatively coupled to the first rotary actuator, the first linear actuator and the second linear actuator, the controller configured to:
generate a processed rotary actuator command based, at least in part, on a preliminary rotary actuator command having frequency content exceeding a bandwidth of the rotary actuator, the processed rotary actuator command having frequency content within a bandwidth of the rotary actuator;
generate a first linear actuator command and a second linear actuator command based, at least in part, on the processed rotary actuator command;
output the processed rotary actuator command to the rotary actuator;
output the first linear actuator command to the first linear actuator; and
output the second linear actuator command to the second linear actuator.

12. The multi-axis machine tool of claim 8, wherein the third linear actuator includes at least one selected from the group consisting of an acousto-optic deflector (AOD) system, a microelectromechanical systems (MEMS) mirror system and an adaptive optical (AO) system.

13. The multi-axis machine tool of claim 12, wherein the third linear actuator is configured to impart relative movement between the tool and the workpiece along at least one selected from the group consisting of the first axis and the second axis.

14. A multi-axis machine tool, comprising:
a laser source configured to generate a beam of laser light;
a tool tip positioning assembly including a scan lens configured to focus the beam of laser light thereby producing a focused beam of laser light having a beam waist, wherein the tool tip positioning assembly further includes at least one positioner arranged between the laser source and the scan lens, operative to move the beam waist along at least one axis, wherein the tool tip positioning assembly includes at least one selected from the group consisting of an acousto-optic deflector (AOD) system, a microelectromechanical systems (MEMS) mirror system and an adaptive optical (AO) system;
a workpiece positioning assembly configured to position the workpiece in a path along which the focused beam of laser light is propagatable, wherein the workpiece positioning assembly is further operative to rotate the workpiece about at least one axis and translate the workpiece along at least one axis; and
a controller operatively coupled to the laser source, the workpiece positioning assembly, and the tool tip positioning assembly and configured to control an operation of the laser source, the workpiece positioning assembly, and the tool tip positioning assembly.

15. The multi-axis machine tool of claim 14, wherein the tool tip positioning assembly is operative to translate the beam waist along at least one axis.

16. The multi-axis machine tool of claim 14, wherein the tool tip positioning assembly is operative to rotate the beam waist about at least one axis.

17. The multi-axis machine tool of claim 14, wherein the tool tip positioning assembly includes:
a first AOD system operative to deflect the beam of laser light along a first axis; and
a second AOD system operative to deflect the beam of laser light along a second axis orthogonal to the first axis.

18. The multi-axis machine tool of claim 17, wherein the controller is further configured to control operations of the first AOD system and the second AOD system to translate the beam waist along the path.

19. The multi-axis machine tool of claim 14, wherein the tool tip positioning assembly includes:

a first AOD system operative to deflect the path along which the focused beam of laser light is propagatable along a first axis;
a second AOD system disposed optically downstream of the first AOD system and operative to deflect the path along a second axis orthogonal to the first axis; and
a relay lens disposed optically downstream of the second AOD system and operative to transform a deflection angle of the path into a laterally-displaced path.

* * * * *